(12) United States Patent
Takanaka

(10) Patent No.: US 6,347,855 B1
(45) Date of Patent: Feb. 19, 2002

(54) RECORDING METHOD AND APPARATUS THEREFOR

(75) Inventor: Yasuyuki Takanaka, Urawa (JP)

(73) Assignee: Canon Kabushiki Kaisha, Toyko (JP)

( * ) Notice: Subject to any disclaimer, the term of this patent is extended or adjusted under 35 U.S.C. 154(b) by 0 days.

(21) Appl. No.: 09/148,469

(22) Filed: Sep. 8, 1998

(30) Foreign Application Priority Data

Sep. 8, 1997 (JP) .............................. 9-242932

(51) Int. Cl.⁷ .............................. B41J 29/393
(52) U.S. Cl. ...................................... 347/19
(58) Field of Search .................. 347/12, 19, 37, 347/40

(56) References Cited

U.S. PATENT DOCUMENTS

| | | | |
|---|---|---|---|
| 4,313,124 A | 1/1982 | Hara | 346/140 |
| 4,345,262 A | 8/1982 | Shirato et al. | 346/140 |
| 4,459,600 A | 7/1984 | Sato et al. | 346/140 |
| 4,463,359 A | 7/1984 | Ayata et al. | 346/1.1 |
| 4,558,333 A | 12/1985 | Sugitani et al. | 346/140 |
| 4,608,577 A | 8/1986 | Hori | 346/140 |
| 4,723,129 A | 2/1988 | Endo et al. | 346/1.1 |
| 4,740,796 A | 4/1988 | Endo et al. | 346/1.1 |
| 5,124,720 A | 6/1992 | Schantz | 347/19 |
| 5,847,723 A | * 12/1998 | Akahira et al. | 347/14 |

FOREIGN PATENT DOCUMENTS

| | | | | |
|---|---|---|---|---|
| EP | 0783973 A2 | * 7/1997 | | 347/19 |
| JP | 54-56847 | 5/1979 | | |
| JP | 59-123670 | 7/1984 | | |
| JP | 59-138461 | 8/1984 | | |
| JP | 60-71260 | 4/1985 | | |
| JP | 62-53492 | 3/1987 | | |
| JP | 3-46589 | 7/1991 | | |
| JP | 4-128052 | * 4/1992 | | 347/19 |
| JP | 5-301427 | 11/1993 | | |
| JP | 6-79956 | 3/1994 | | |
| JP | 8-25700 | 1/1996 | | |

* cited by examiner

Primary Examiner—John Barlow
Assistant Examiner—Julian D. Huffman
(74) Attorney, Agent, or Firm—Fitzpatrick, Cella, Harper & Scinto

(57) ABSTRACT

In case a defect in the ink discharge performance is generated in a nozzle in an ink jet printing head, the printing is executed by a main scanning operation of a printing head, excluding data corresponding to such defective nozzle. Then, a sub-scan is executed by a width corresponding to the defective nozzle, and the complementary printing is executed with a complementary recording nozzle without abnormality, in the returning main scan. When the total sum of the number of drives of the complementary recording nozzle exceeds a predetermined value, the amount of sub-scan for complementary recording, thereby changing the nozzle used therefor. In this manner, even in case of abnormality in a recording element, a defect-free record can be obtained by the complementary recording, and a substantial service life of the recording head can be extended in case of obtaining such defect-free record by the complementary recording.

17 Claims, 21 Drawing Sheets

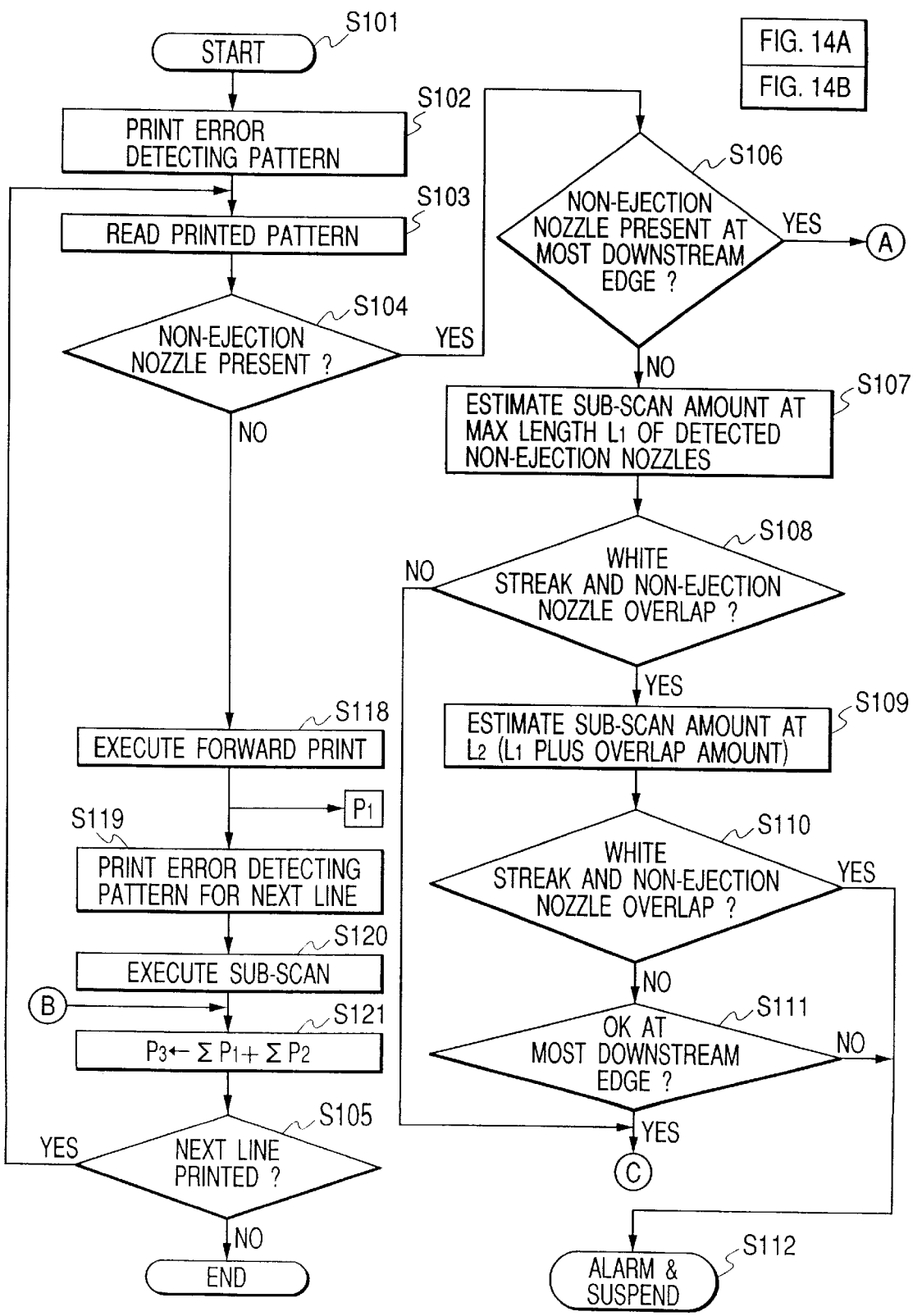

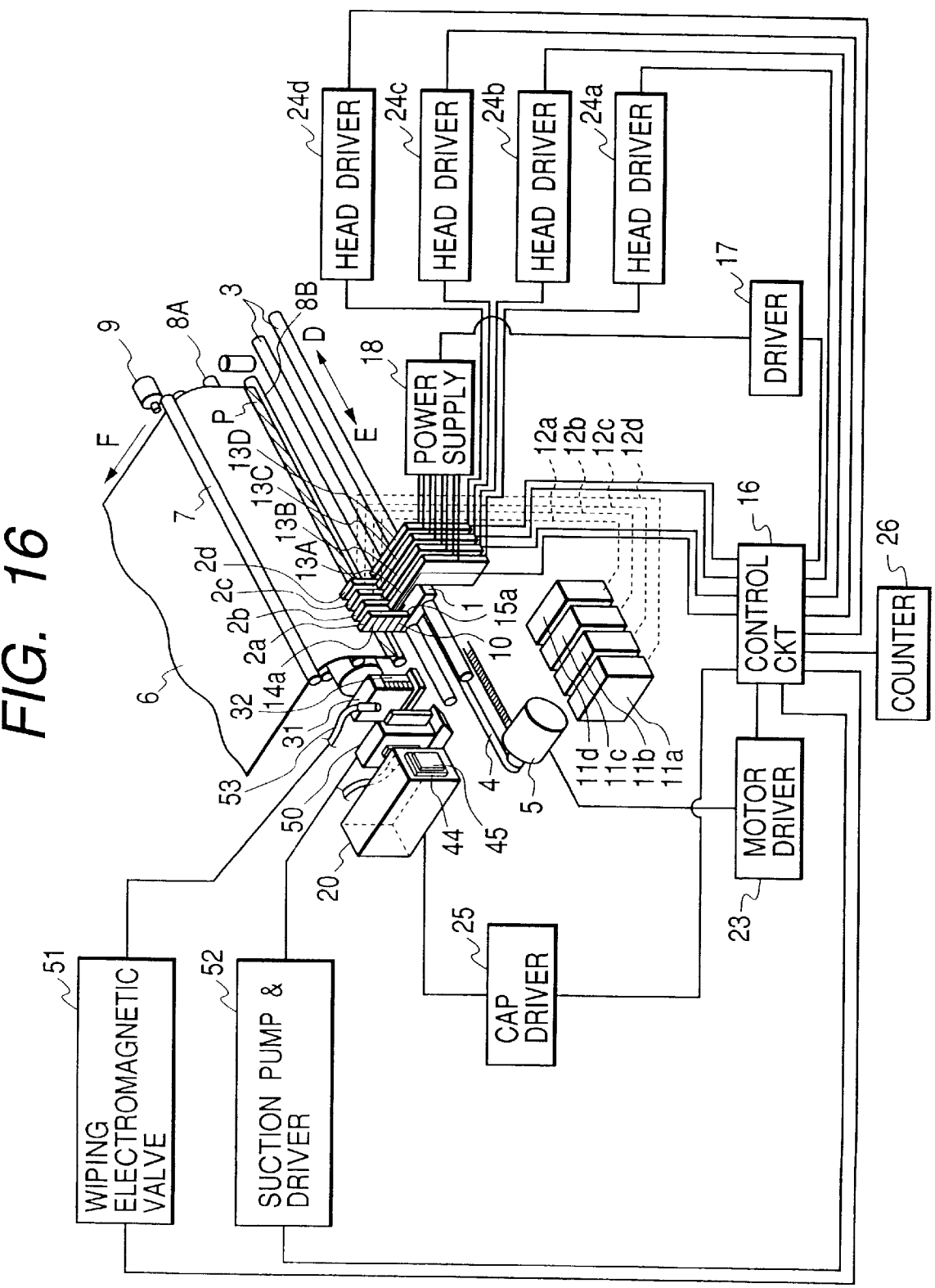

RECORDING METHOD AND APPARATUS THEREFOR

BACKGROUND OF THE INVENTION

1. Field of the Invention

The present invention relates to an ink jet recording apparatus utilizing a liquid discharge head for discharging liquid such as ink, and more particularly to a printing apparatus for executing printing on a recording medium such as a paper, a cloth, a non-woven cloth, an OHP sheet or the like.

In particular, the present invention is effective for a printing apparatus for executing a continuous printing operation over a prolonged period, or a printing apparatus for executing a continuous printing operation on a cloth of width of 1 meter or larger. More specifically, the present invention is applicable to an office equipment such as a printer, a copying apparatus, an ink jet printer or a facsimile machine, or a large production equipment such as a cloth printing apparatus.

2. Related Background Art

As conventional liquid discharging apparatus, there have been known an apparatus for forming an image by discharging ink droplets onto a recording medium, and an apparatus utilizing discharge of special liquid. An ink jet recording apparatus (the former) is to form an image by discharging ink droplets onto a recording medium. This apparatus is featured by providing a desired result in a stable manner because intervening factors in the image formation are less in comparison with an electrophotographic process.

Since, in general, a discharging unit for discharging liquid has very small structures, there may result adhesion of dye or pigment contained in the liquid or defective discharge by adhesion of contaminant particles. These phenomena result in defective recording in such liquid discharging apparatus as an ink jet recording apparatus. For avoiding these phenomena, there has been adopted forced discharge of liquid, cleaning of the liquid discharging area containing the discharging unit or discharge of gas or liquid to such discharging area by suction or pressurizing with so-called recovery means at a suitable interval.

In the ink jet recording apparatus, image formation is made with fine nozzles in order to achieve recording of higher quality and finer resolution. However, the use of such fine nozzles leads to unstable recording and deterioration of the recorded image because of the above-mentioned drawbacks. The recorded image may be deteriorated for example by skew in recording, caused by a delicate difference in the landing position of ink droplet resulting instability in the ink discharging direction, failed discharge (non-ejection) resulting from clogging of the discharge opening (nozzle) with dusts or viscosified ink, failed discharge resulting from breakage of an electrothermal converting element (heater) in a bubble jet method employing the heater for generating a bubble in the ink for discharge thereof, or failed discharge resulting from deposition of an ink droplet on a surface of a discharge opening to thereby cover the opening with the ink droplet.

Such failed discharge generates an unrecorded line along the scanning direction in a serial printer, creating a white streak in a recorded image and significantly deteriorating the quality of the recorded image.

In case the number of nozzles is increased to hundreds or thousands in order to increase the throughput of printing, the probability of such abnormality in the nozzles increases proportionally, so that it becomes more difficult to obtain a defect-free image.

Also, in manufacturing the recording head, there has been required a defect-free head in which all the nozzles are normal. However, with the increase of the number of nozzles as mentioned above, the probability of generation of defects in the course of manufacture increases proportionally to deteriorate the production yield, thereby elevating the manufacturing cost and eventually the price in the market.

Also, in the conventional configuration, even a defect-free head becomes unusable for recording if the failure is generated in one of many nozzles in the course of recording. For this reason, in a printing apparatus utilizing a multi-nozzle head with 6 to 8 nozzles, abnormality in the nozzle is often encountered, thus generating a defective print each time. Also, as the head has to be replaced for each generation of abnormal nozzle, there is involved the cost for such replacement and the operation of the apparatus has to be interrupted.

Furthermore, in the recording apparatus not only of the ink jet recording method but also of various recording methods employing varied recording elements for image formation on the recording medium, in case the recording element becomes incapable of recording for example by a damage, it is necessary either to continue the recording operation in a state in which a part of the recording dots is lacking in the recorded image or to interrupt the recording operation and restore the recording state for example by replacing the recording head.

In order to overcome the drawbacks as mentioned above, the present applicant discloses, in the Japanese Patent Application Laid-open No. 6-79956, a method of complementary recording for a recording position by a nozzle which generates failure in discharge (or non-ejection). In this method, a multi-nozzle head is used to execute serial scanning. A predetermined area is divided into plural scans, which are complementarily recorded as a multi-scan recording. Thus, the recording position corresponding to a defective nozzle is complementarily recorded in another scan, thereby preventing deterioration of the image resulting from the failed discharge.

Also, the above-mentioned Japanese Patent Application Laid-open No. 6-79956 discloses a configuration in which the image data of a defective nozzle are recorded in complementary manner by a separately provided head.

As explained in the foregoing, the invention proposed in the Japanese Patent Application Laid-open No. 6-79956 achieves complementary recording for the defective nozzle by reducing the image defect (white streak, skew) caused by an abnormality in the nozzle such as failed discharge. However, in the multi-scanning method disclosed therein, the nozzle effecting the complementary recording prints the overlapping data, and such complementary recording is switched to a speed allowing to record such overlapping data. Therefore, in the multi-scanning recording method in which the sub-scanning is executed by a half of the recordable width, the printing speed is lowered to about a half. In a practical case in which all the nozzles are not completely functions, but a defect exists such as to cause a failed discharge being generated in a certain number of nozzles, the printing speed of the proposed recording apparatus has to be substantially lowered.

The above-mentioned laid-open publication also discloses a configuration in which the image data of a defective nozzle are recorded in complementary manner by a separately provided head. Such configuration allows the recording without decrease in the recording speed, but there is required an exclusive head for complementary recording, which is unnecessary in the absence of abnormality in the nozzle such as failed discharge and which has to be maintained in the complete discharging state. The head becomes expensive particularly in case high-speed recording is intended with an increased number of nozzles in the head. In a color recording apparatus, there are required exclusive complementary heads corresponding to plural colors, so that the apparatus becomes not only expensive but also complex in structure. Furthermore, the apparatus becomes inevitably bulky.

Also, the Japanese Patent Application Laid-open No. 5-301427 of the present applicant discloses a configuration of detecting a state immediately after recording with a sensor, identifying a failed discharge state by calculating the difference between data to be recorded and the detected state, and executing a complementary recording in a subsequent scan or with an ensuing complementary head. However, such configuration does not resolve all the drawbacks mentioned in the foregoing.

Furthermore, the U.S. Pat. No. 5,124,720 discloses a configuration in which, in case of generation of a defective nozzle, recording is executed with a part of a head not including a defective nozzle. In such configuration, if the failure in discharge occurs at the center of the head, a recording operation is executed with a former or latter part of the head excluding such defective portion, so that a usable portion of the head decreases drastically in case of plural failures. Moreover, in case this configuration is applied to a color recording apparatus, the usable portion of the recording head is extremely reduced as the defective portions of the heads of other colors have also to be considered, whereby the recording speed is significantly lowered.

Furthermore, the Japanese Patent Application Laid-open No. 8-25700 of the present applicant discloses a recording apparatus/method of detecting a defective (undischarging) nozzle prior to a recording operation, executing the recording operation in the forward scanning direction by deleting data corresponding to such defective nozzle (with creation of a white streak), executing, prior to a reverse scanning operation, a sub-scanning operation by a predetermined amount so that the defective nozzles do not overlap with the created white streak and applying the deleted data in the reverse order to a satisfactory nozzle, thereby executing complementary recording on the created white streak. With this configuration, the nozzle executing the complementary recording is used both in the forward and reverse scanning operations, and the frequency of drive for ink discharge in such nozzle increases by the frequency of drive in the reverse scanning operation.

For example, in the discharge means utilizing an electrothermal converting member (heater), the frequency of drive means the number of pulse signals applied for ink discharge, and the service life of such heater is generally in a range of $10^8$ to $10^{10}$ pulses. Beyond such service life, the heater is no longer operable and the corresponding nozzle becomes unrecoverable. Consequently, the nozzle that is used also for complementary recording reaches the limit of such service life earlier (in simplified manner, the service life of such nozzle is reduced to a half). Consequently the nozzle having been used for complementary recording becomes inoperable earlier, thus reducing the service life of the entire recording head.

SUMMARY OF THE INVENTION

An object of the present invention is to provide a recording method and a recording apparatus capable of providing a proper recorded result by complementary recording even in case of an abnormality in a recording element. A second object of the present invention is to provide a recording method and a recording apparatus capable of extending a substantial service life of a recording head in case of obtaining a proper recorded result by complementary recording. A third object of the present invention is to provide a recording method and a recording apparatus capable of suppressing the a loss in throughput in the complementary recording mentioned above.

The above-mentioned objects can be attained, according to the present invention, by a recording method of repeating a main scanning operation by moving a recording head including an array of plural recording elements relative to a recording medium and driving the recording elements in the course of the movement to thereby record on the recording medium and a sub-scan operation by moving the recording head in a direction, relative to the recording medium, perpendicular to a direction of the main scanning operation, the method comprising steps of:

forming a record on the recording medium by the main scanning operation;

executing the sub-scanning operation, in case of abnormality in at least one of the plural recording elements, in such a manner that a position on the recording medium that has been opposed to an abnormal recording element is opposed to another recording element;

executing a complementary recording operation with the above-mentioned another recording element while moving the recording head in the above-mentioned main scanning direction; and changing the amount of the sub-scanning operation for the complementary recording according to the total sum of frequency of recording by the above-mentioned another recording element, thereby changing the recording element employed in the complementary recording.

Also, according to the present invention, there is provided a recording apparatus provided with main scanning means for causing a recording head including an array of plural recording elements to execute a main scanning operation relative to a recording medium, recording head drive means for driving the recording elements in the course of the main scanning operation by the main scanning means to thereby record on the recording medium, and sub-scanning means for causing the recording head to execute a sub-scanning operation relative to the recording medium in a direction perpendicular to the main scanning operation, the apparatus comprising:

counter means for counting the frequency of drive of the recording element; and control means for driving the sub-scanning means, in case of an abnormality in at least one of the plural recording elements, in such a manner that, after a main scanning operation, a position on the recording medium that has been opposed to an abnormal recording element is opposed to another recording element, driving the recording head drive means so as to execute a complementary recording with the above-mentioned another recording element on the recording medium, and changing the amount of drive by the sub-scanning means thereby changing the recording element used in the complementary recording according to the total sum of drive of the above-mentioned another recording element counted by the counter means.

According to the above-described configuration of the present invention, in case of abnormality in a recording element, there is executed a sub-scanning operation by a predetermined amount corresponding to the abnormal recording element after a recording operation in the main scanning operation, and a complementary recording operation by a normal recording element in a portion unrecorded in the main scanning operation, whereby obtained is a recorded result without defect. The frequency of recording by the recording element used in the complementary recording is counted, and the recording element used in such complementary recording is changed according to the total sum of such frequency of recording, whereby the frequency of recording is not concentrated on a particular recording element and there can be suppressed the decrease of a service life in the recording element used for the complementary recording.

The recording element used in complementary recording is preferably changed by setting a reference value based on a service life value of the number of drives of the recording element and when the total number of drives of the recording element used for the complementary recording exceeds such reference value.

The complementary recording mentioned above may be executed in a reverse scanning operation after the main scanning operation, or in a next main scanning operation. By executing the complementary recording in such reverse scanning operation, a defect-free recorded result can be obtained in a reciprocating cycle of the recording head, so that the throughput of recording is not lowered.

The abnormality in the recording element may be detected by abnormality detection means provided for this purpose. The abnormality in the recording elements can be easily detected by employing an optical detector as the abnormality detection means and optically detecting a pattern formed by driving all the recording elements.

BRIEF DESCRIPTION OF THE DRAWINGS

FIG. 16 is a view showing a partial configuration of an ink jet printing apparatus in which the present invention is applicable;

DETAILED DESCRIPTION OF THE PREFERRED EMBODIMENTS

Figure 1A:
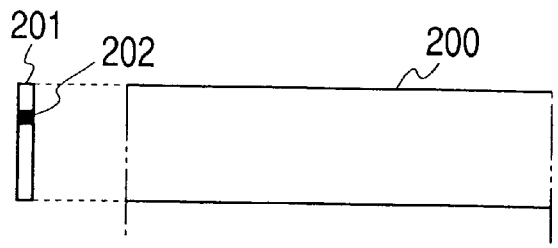
FIGS. 1A, 1B, 1C, 1D, 1E, 1F, and 1G are views showing a first embodiment of present invention.

The embodiments of the present invention will be described with reference to the attached drawings.

At first, there will be given an explanation on an ink jet printing apparatus to which the present invention is applicable. FIG. 16 shows a configuration of an ink jet printing apparatus, constituting an example of a liquid discharging apparatus to which the present invention is applicable.

Referring to FIG. 16, a carriage 1 supports color printing heads 2a, 2b, 2c, 2d respectively corresponding to cyan, magenta, yellow and black colors and is movably guided by a guide shaft 3.

An endless belt 4 is coupled in a part thereof with the carriage 1 whereby the carriage 1 is driven, through the belt 4 and along the guide shaft 3, by a driving motor 5 consisting of a stepping motor driven by a motor driver 23, parallel to the recording surface of a recording medium 6 (hereinafter called printing sheet) such as a paper, an OHP film or a cloth. Thus, the carriage 1, the guide shaft 3, the belt 4 and the driving motor 5 constitute the main scanning means.

There are also provided a transport roller 7 for transporting the printing sheet 6, guide rollers 8A, 8B for guiding the printing sheet 6, and a printing sheet transport motor 9. The transport roller 7, the guide rollers 8A, 8B and the printing sheet transport motor 9 constitute the sub-scanning means.

Each of the printing heads 2a, 2b, 2c, 2d is provided with plural nozzles 10 constituting recording elements for discharging ink droplets toward the printing sheet 6, and the nozzles 10 receive ink supply from ink tanks 11a, 11b, 11c, lid through ink supply tubes 12a, 12b, 12c, 12d respectively corresponding to the printing heads 2a, 2b, 2c, 2d. A discharge opening constituting an open end of each nozzle 10 is provided on a face, opposed to the printing sheet 6, of the printing head 2a, 2b, 2c or 2d, and such opposed face will hereinafter be called a discharge opening face.

Each nozzle 10 is provided with energy generating means (not shown) for generating energy to be utilized for ink discharge, and such energy generating means are selectively given ink discharge signals from the head drivers 24a, 24b, 24c, 24d through flexible cables 13A, 13B, 13C, 13D.

The printing heads 2a, 2b, 2c, 2d are respectively provided with head heaters (see, for example, head heater 14a for printing head 2a in FIG. 16) and temperature detection means (see, for example, temperature detecting means 15a for printing head 2a in FIG. 16) and detection signals from the temperature detecting means 15a is supplied to a control circuit 16 which includes a CPU and controls the heating by the head heaters 14a through a motor driver 17 and a power source 18 based on the detection signals.

Capping means 20 is to be contacted with the discharge opening faces of the printing heads 2a, 2b, 2c, 2d in a non-printing state, and, in such nonprinting state, the printing heads 2a, 2b, 2c, 2d move to a position opposed to the capping means 20. In such state, the capping means 20 is advanced by a cap driver 25 and executes capping by bringing an elastic member 44 into contact with the discharge opening faces.

If the printing heads 2a, 2b, 2c, 2d are left in the air for a prolonged period, the ink present in the nozzles 10 evaporates and becomes viscous, whereby the ink discharge becomes unstable. For avoiding such phenomenon, the nozzles 10 are sealed from the external air by capping in the non-printing state. In the interior of a capping member, there is provided a liquid holding member 45, moistened with liquid, thereby maintaining the interior of the capping member at a high humidity state and minimizing the increase in the ink viscosity.

Also, in a prolonged capped state, there is executed a recovery operation by ink pressurization. In such prolonged standing, even with capping, the ink present inside the discharge opening evaporates and becomes viscous, though slowly. Also, a bubble may sometimes remain in the discharge opening to disturb stable ink discharge. For this reason, at the start of a printing operation, pumps provided in the ink tanks 11a, 11b, 11c, 11d are activated to pressurize the inks, thereby expelling the viscosified ink or the remnant bubble from the discharge opening. This operation is also effective for washing off the dusts deposited on the discharge opening face or the dusts intruding in the discharge openings, thereby ensuring stable ink discharge.

Clogging prevention means 31 serves to receive the discharged ink in case the printing heads 2a, 2b, 2c, 2d execute an idle discharge (preliminary discharge) operation. The clogging prevention means 31 is provided with a liquid receiving member 32 opposed to the printing heads 2a, 2b, 2c, 2d, serving as a liquid receiving unit for absorbing the ink emitted by the idle discharge operation and positioned between the capping means 20 and a print start position. The liquid receiving member 32 and the liquid holding member 45 are advantageously composed of a sponge-like porous material or a sintered plastic material.

The idle discharge operation means an ink discharge not intended for printing, and is conducted for temperature compensation in an area of which temperature is lowered by a discharged liquidous or gaseous flow and for expelling the unnecessary substances from the discharge openings. In addition, predetermined driving pulses are given prior to the start of the printing operation, thereby discharging ink from all the discharge openings for example toward the capping member (aging operation). Also, for increasing the moistened state in the atmosphere around the discharge openings, such operation may be executed in the capped state.

Cleaning means 50 is connected to a washing (or wiping) electromagnetic valve 51 and a suction pump driver 52, which execute emission of washing liquid from wiping means 53 and suction of washing liquid from the cleaning means 50, under the control by the control circuit 16.

In FIG. 16, there is further provided a counter unit 26 which will be explained later in more details.

Now the printing heads 2a, 2b, 2c, 2d will be explained with reference to FIG. 17, which shows an example of the printing heads in the ink jet printing apparatus shown in FIG. 16.

Figure 17:
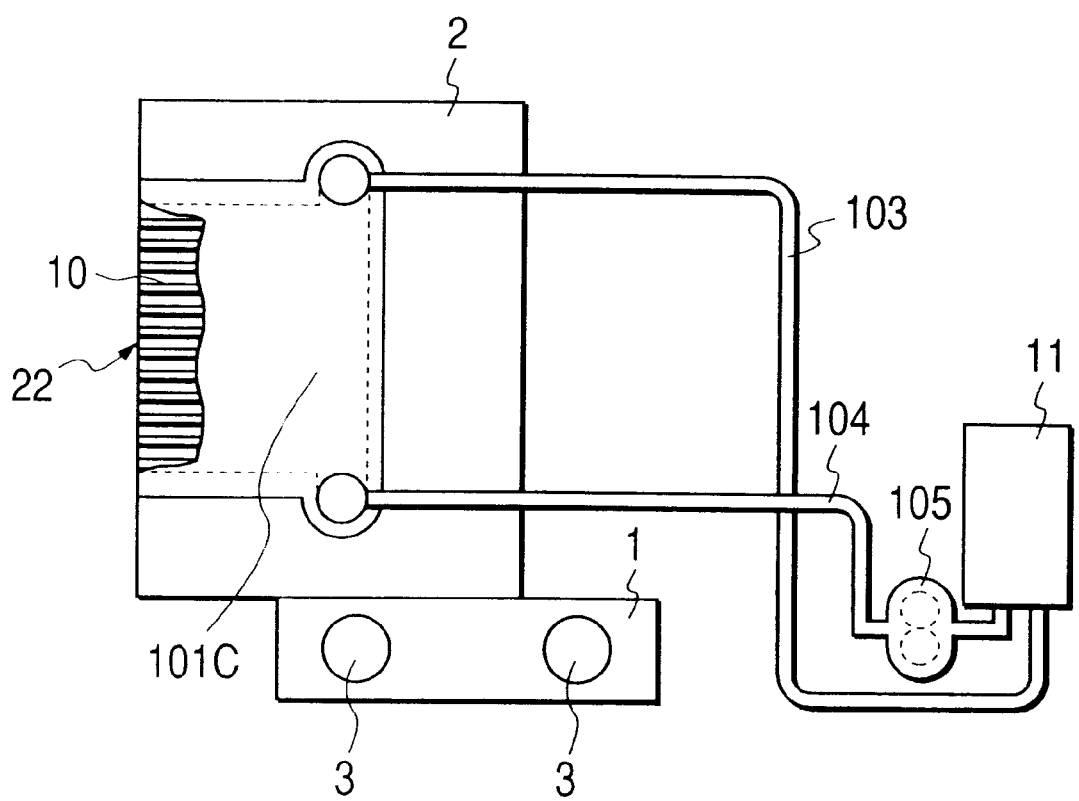
FIG. 17 is a view showing the configuration of a recording head of the ink jet printing apparatus shown in FIG. 16.

In FIG. 17, there are shown the printing head 2 and the discharge opening face 22 thereof, on which opened are the discharge openings constituting the open ends of the plural nozzles 10 arranged in parallel vertical rows. Each nozzle 10 is provided with a discharge energy generating element such as an electrothermal converting member. An ink chamber 101C for commonly supplying the nozzles 10 with ink, and is connected with the ink tank 11 through supply pipes 103, 104. The supply pipe 104 is provided with a gear pump 105 for executing a process of pressurizing the ink toward the ink supply system of the printing head 2 in removing bubbles and dusts contained in the supply path or in the nozzle 10 or at the recovery operation for removing the viscosified ink, thereby discharging the ink from the discharge openings, or for executing an ink refreshing process by circulating the ink in the supply pipes 103, 104 and in the ink chamber 101C (hereinafter called pressurized circulation process).

Now the cleaning means 50 shown in FIG. 16 will be explained in more details with reference to FIGS. 18 and 19, which are respectively a cross-sectional view of the cleaning means 50 seen from the main scanning direction of the printing head 2 and a cross-sectional view of the cleaning means 50 and the printing head 2 seen from above.

Figure 18:
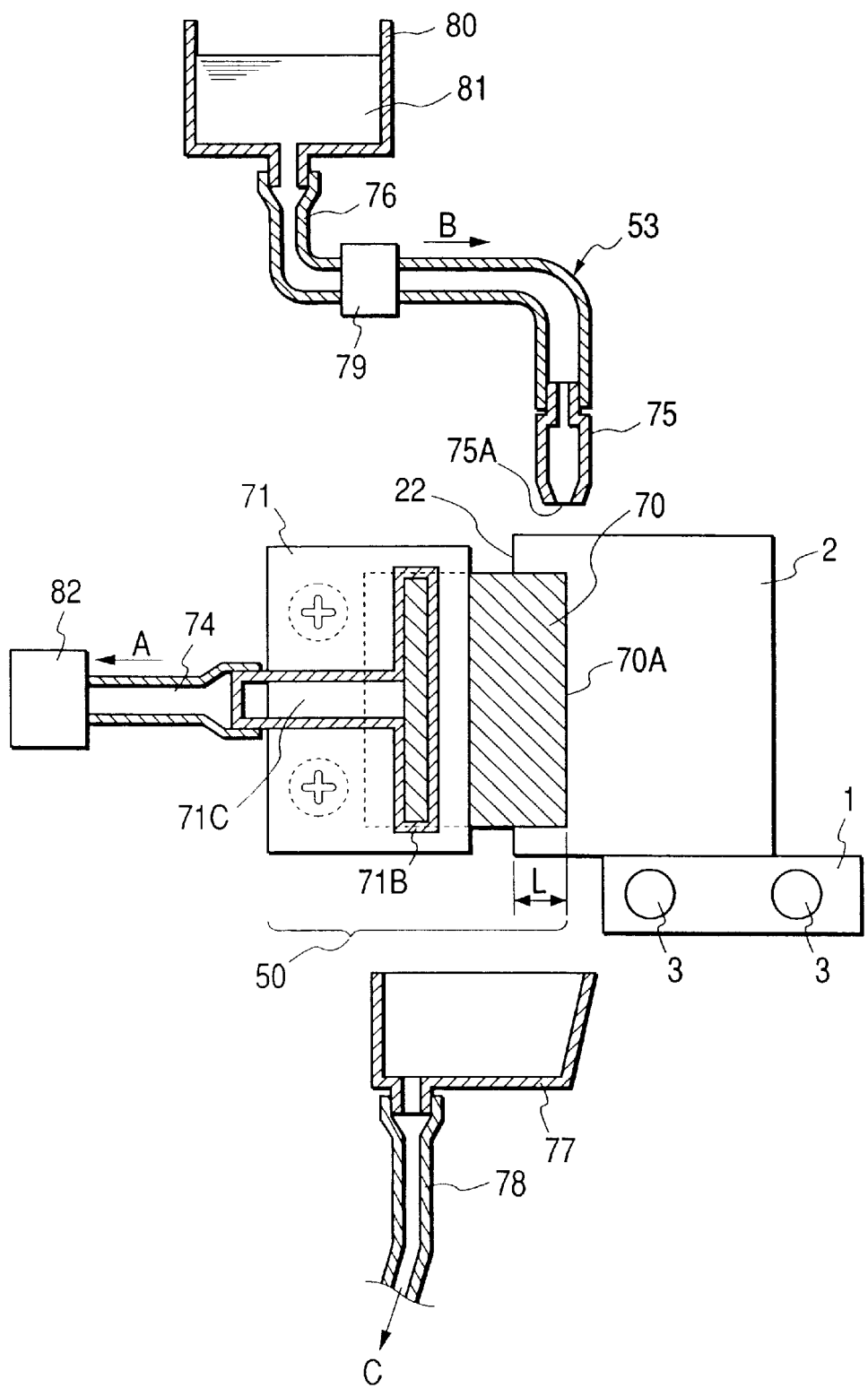
FIG. 18 is a cross-sectional view of cleaning means of the ink jet printing apparatus shown in FIG. 16, seen from the main scanning direction of the recording head.
Figure 19:
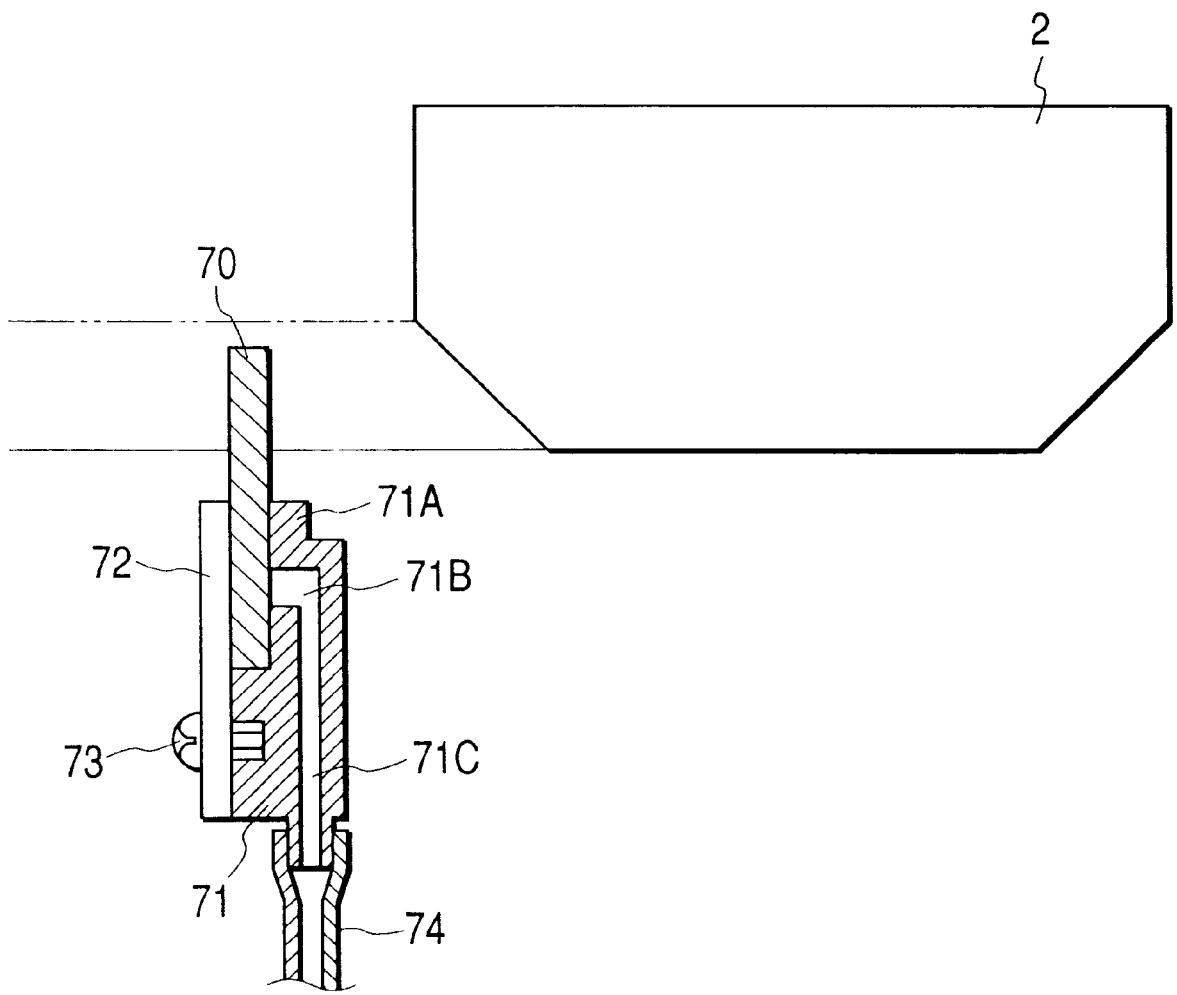
FIG. 19 is a cross-sectional view, seen from above, of the cleaning means and the recording head in the ink jet printing apparatus shown in FIG. 16.

As shown in FIGS. 18 and 19, the cleaning means 50 is composed of a cleaning member 70, constituting wiping means for wiping the discharge opening face (cf. FIG. 17) of the printing head 2 and fixed to a fixing plate 72 by a holder 71. The cleaning member 70 is composed of a flexible porous member. It may be composed of a porous polymer member, which is preferably not a member showing eminent volume change upon absorption of ink mist such as a foamed polymer member but a member not showing volume change upon absorption of ink mist. A preferred example of such member includes a member composed of foamed formal resin.

The ink absorbing member may also be composed of a thermally sintered porous polymer member composed for example of low density polyethylene, high density polyethylene, high molecular weight polyethylene, composite polyethylene, polypropylene, polymethyl methacrylate, polystyrene, acrylonitrile copolymer, ethylene-vinyl acetate copolymer, fluorinated resin or phenolic resin. Among these, particularly preferred are low density polyethylene, high density polyethylene, high molecular weight polyethylene and polypropylene, in consideration of the absorbing ability for ink mist and the resistance to ink.

The cleaning member 70 is fixed with fixing screws 73 between the holder 71 and the fixing plate 72. The holder 71 is provided, in a face 71A thereof contacting the cleaning member 70, with an aperture 71B, which is connected with a suction tube 74 through a connection path 71C, whereby the washing liquid and the ink contained in the cleaning member 70 are discharged in a direction A by suction means 82 composed of a pump. The suction means 82 may also be so constructed as to form a liquid discharge path by contacting a porous member of a fibrous member with the cleaning member 70 thereby discharging the washing liquid therefrom.

It is possible to restore the absorbing ability for the ink and other substances thereby increasing the cleaning effect on the discharge opening face 22 of the printing head 2, by suitably decreasing the amount of the washing liquid remaining in the cleaning member 70 after the washing operation by suction of the washing liquid. Also, as the front end portion 70A of the cleaning member 70 overlaps, by a length L, with the discharge opening face 22 of the printing head 2, the discharge opening face 22 is wiped by such overlapping portion in the scanning operation of the printing head 2.

On the other hand, wiping-washing means 53 is provided with a tank 80 containing washing liquid 81, a washing liquid supply tube 76 connected with the tank, and a washing liquid supply nozzle 75 connected to the end of the washing liquid supply tube 76. The nozzle 75 is positioned above the cleaning member 70 and a discharge portion 75A of the nozzle 75 is directed toward the cleaning member 70. The washing liquid supply tube 76 is provided with an electromagnetic valve 79 which, when opened, supplies the washing liquid 81 from the tank 80 in a direction B. The supplied washing liquid 81 is discharged from the discharge portion 75A of the supply nozzle 75 toward the cleaning member 70, thereby washing the cleaning member 70.

Below the cleaning member 70, there is provided a receiving pan 77, which receives the washing liquid 81 discharged from the nozzle 75 and not absorbed in the cleaning member 70, and the ink and other substances deposited on the cleaning member 70 and dropping together with the cleaning liquid, and which is connected to a discharge tube 78 for discharging the washing liquid, received by the receiving pan 77, in a direction C toward a discharge unit (not shown).

Figure 20:
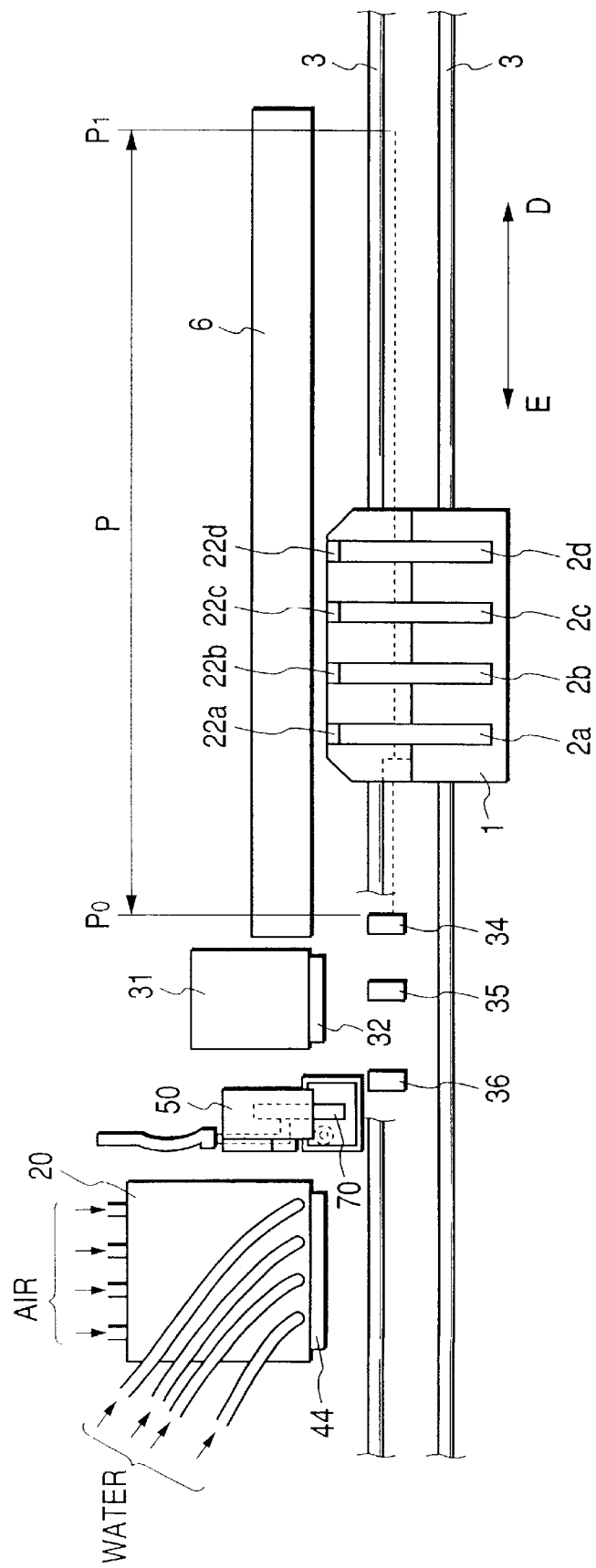
FIG. 20 is a plan view, seen from above, of the ink jet printing apparatus shown in FIG. 16.

In the following, there will be explained the function of the ink jet printing apparatus. Referring to FIG. 20, a print start sensor 34 and a capping means sensor 36 respectively detect that the printing heads 2a, 2b, 2c, 2d are in a predetermined capping position. An idle discharge position sensor 35 detects the reference position for the idle discharge operation to be executed by the printing heads 2a, 2b, 2c, 2d in the course of scanning operation thereof.

Figure 21:
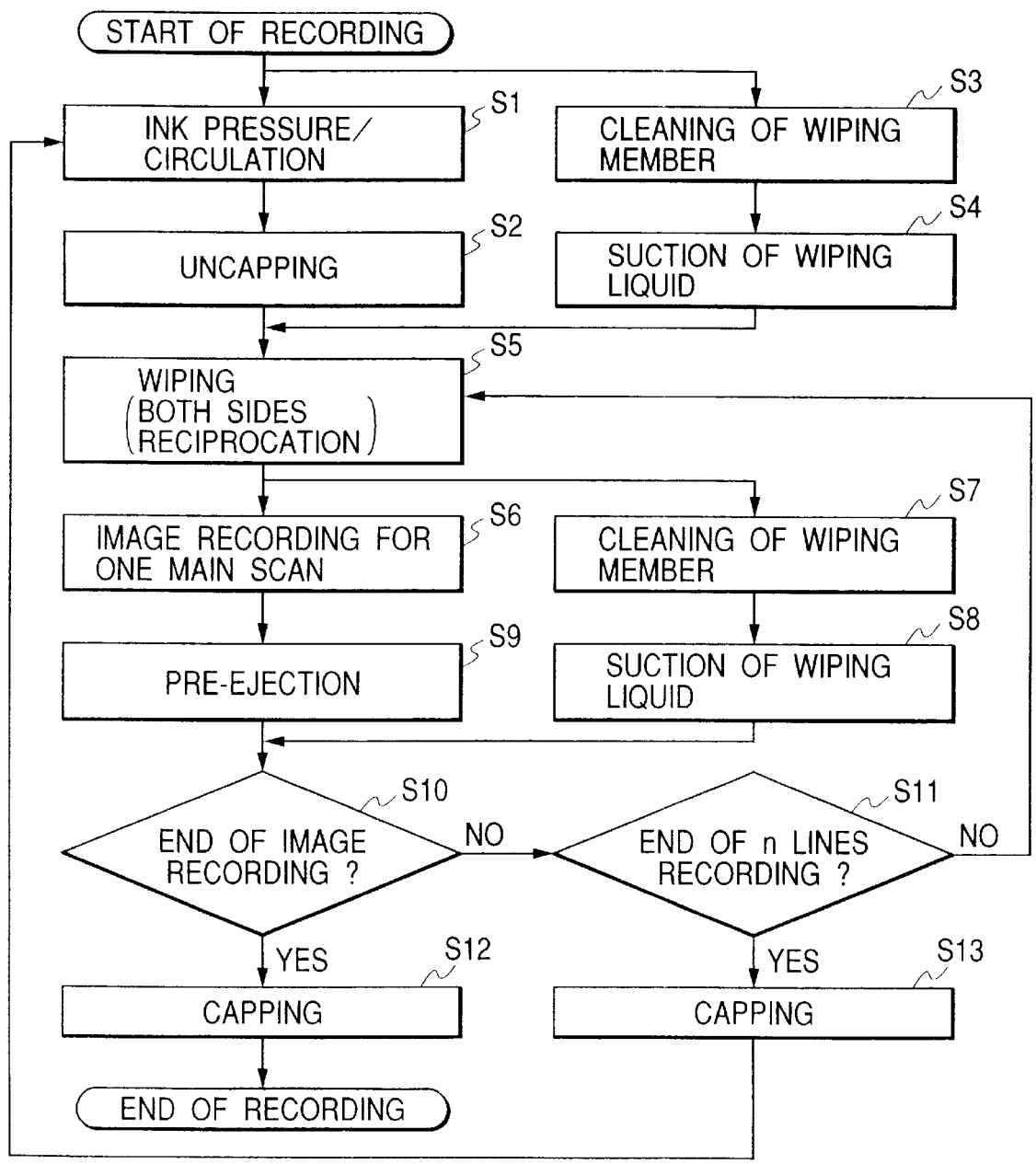
FIG. 21 is a flow chart showing the basic operation sequence of the present invention, in the ink jet printing apparatus shown in FIGS. 16 to 20.

FIG. 21 is a flow chart showing the operation sequence of the basic technology of the present invention, based on the above-described configuration. In a stand-by state, the discharge opening faces 22a, 22b, 22c, 22d (hereinafter collectively represented by 22) of the printing heads 2a, 2b, 2c, 2d (hereinafter collectively represented by 2) are capped by the capping means 20. When a print signal is entered into the control circuit 16, there is initiated an ink pressurized circulating operation (step S1). Then, the capping member is released (step S2).

Simultaneous with the recovery operation by ink pressurized circulation, the washing of the cleaning member 70 is executed (step S3), whereby the viscosified ink and other substances sticking to the cleaning member 70 are washed off with the washing liquid.

Then, a step S4 executes suction of the washing liquid for suitably decreasing the washing liquid remaining on the cleaning member 70, thereby increasing the collecting ability for the ink and other substances and improving the cleaning effect of the cleaning member 70. Also, the suction of the washing liquid generates a negative pressure by capillary phenomenon in the porous material constituting the cleaning member 70. This negative pressure is made larger than the negative pressure in the nozzles 10 of the printing head 2 to create a state of extracting the ink from the nozzles 10 in the cleaning operation, whereby the washing liquid is prevented from entering the liquid chamber. As there is also generated ability for absorbing the ink from the interior of the nozzles, an effect for simultaneously eliminating the viscosified ink from the nozzles is also achieved.

Then, a drive signal is generated by the motor driver 23, whereby the motion of the driving motor 5 is transmitted through the belt 4 to the carriage 1 to thereby drive the printing heads 2 to execute a reciprocating motion. When the carriage 1 passes through the cleaning means 50, the cleaning member 70 executes a cleaning operation by wiping the discharge opening faces 22 in succession (step S5). In the present embodiment, the wiping means elimination of the washing liquid, ink and other substances from the discharge opening faces by a wiping operation.

The printing heads 2 are driven in the course of motion in a direction D, starting from a print start position P0 detected by the print start sensor 34, whereby the ink droplets are discharged to print an image in a printing portion P of the printing sheet 6 (step S6). This operation is called a main scanning operation.

At the same time, the cleaning member 70 is washed (step S7), and then there is executed the suction of the washing liquid (step S8) for restoring the cleaning ability of the cleaning member 70. Subsequently, the carriage 1 is reversed, driven in a direction E and executes a preliminary discharge operation in passing a preliminary discharge position (step S9). The preliminary discharge operation is executed toward the liquid receiving member 32. Then, the printing sheet 6 is transported by a predetermined distance in a direction F (cf. FIG. 16). This operation is called a sub-scanning operation.

Then, if the image printing operation is to be continued (negative result in a step S10) and if the printing of n lines has not been completed (negative result in a step S11), the sequence returns to the step S5 whereupon the carriage 1 executes a reciprocating motion in the course of which a cleaning operation is conducted with the cleaning member 70 (step S5). As the wiping operation is executed with the difference faces of the cleaning member 70 respectively in the forward motion and in the reverse motion, there is no detrimental effect on the cleaning and the cleaning effect is doubled.

In case the image printing operation is completed (affirmative result in the step S10) or in case the printing of n lines is completed (affirmative result in the step S11), the discharge opening faces 22 of the printing heads 2 are sealed by capping with the capping means 20 (steps S12, S13).

The main scanning operation, the activation of the energy generating elements and the sub-scanning operation as mentioned above are controlled by the instructions from the control circuit 16. Also, the control circuit 16 supplies the counter unit 26 with the number of the ink discharge signals given to the head drivers 24a, 24b, 24c, 24d for switching the complementary recording nozzle in the complementary recording to be explained in the following embodiments. The counter unit 26 calculates the number of the ink discharge signals or the number of drives for each printing head 2, and supplies the control circuit 16 with the total sum of the number of drives for each printing head 2. The control circuit 16 switches the complementary recording nozzle based on such total number of the drives.

In the following, there will be explained embodiments of complementary recording in case of generation of an abnormal nozzle and switching of the nozzle for such complementary recording, in the above-described printing apparatus.

[First embodiment]

In the following, there will be explained a first embodiment of the present invention.

FIGS. 1A to 1G illustrate the first embodiment of the present invention. In a state shown in FIG. 1A, prior to the printing operation, it is detected whether, in a multi-nozzle printing head 201 provided with an array of plural nozzles executes detection, abnormality is present in any of the nozzles. The nozzles with abnormality include a nozzle incapable of ink discharge (or non-ejection nozzle), a nozzle with skewed ink discharge, and a nozzle recording an excessively large or small dot, and such nozzle will be hereinafter collectively represented as "ejection error nozzle or defective nozzle 202". The defective nozzle 202 may be present singly or in a group consisting of plural adjacent nozzles. In FIG. 1A, 200 indicates a printing area.

Figure 1B:
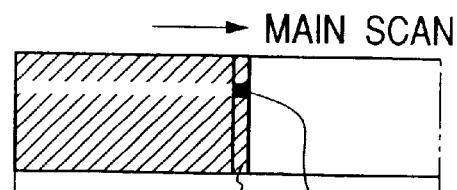
Figure 1C:
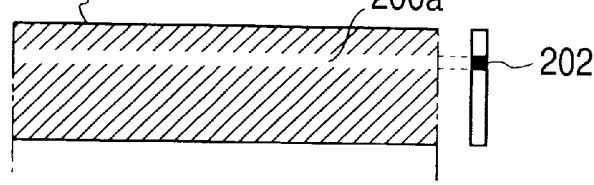

Then, as shown in FIG. 1B, the printing head 201 executes a main scan to print a row, excluding the image data corresponding to the defective nozzle 202 detected by the above-described detection process. As a result of such printing, the printing area 200 shows a white streak 200a corresponding to the defective nozzle 202, as shown in FIG. 1C.

Figure 1D:
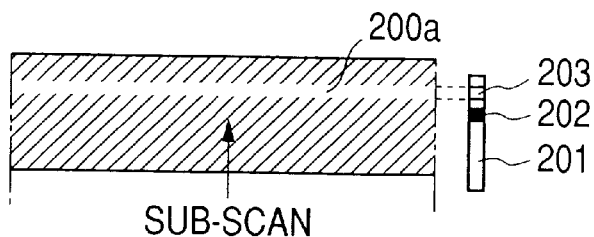

Then, as shown in FIG. 1D, there is executed a sub-scan for complementary recording by the width of the white streak 200a, namely by the width corresponding to the defective nozzle 202, whereby a nozzle (or a group of nozzles) with satisfactory discharging ability is positioned corresponding to the white streak 200a and is used as complementary recording nozzle (or nozzles) 203. The amount of such sub-scan is not limited to that explained above but can be arbitrarily selected as long as the printing head 201 is so positioned as to print the area, that has not been recorded in the preceding main scan, with a satisfactory nozzle.

Figure 1E:
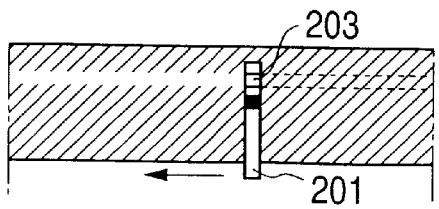
Figure 1F:
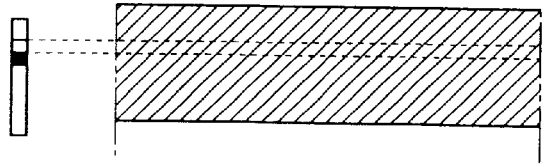
Figure 1G:
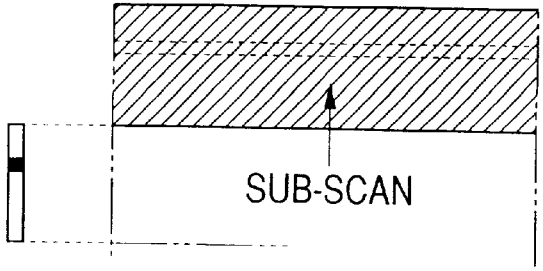

Then, as shown in FIG. 1E, the image data of the portion that has not been printed in the preceding main scan are printed with the complementary printing nozzle 203 in the reverse scan of the printing head 201, thereby complementing the area of the white streak 200a. As a result, a defect-free image as shown in FIG. 1F is obtained. Subsequently a sub-scan is executed for enabling the printing in a next printing area as shown in FIG. 1G, and the steps explained above are thereafter repeated.

Now, the number of drives of the complementary nozzle 203 is considered. The number of drives after the printing in FIG. 1B is represented by $P_1$, while that after the complementary printing in FIG. 1E is represented by $P_2$, and the sum of $P_1$ and $P_2$ is represented by $P_3$ ($=P_1+P_2$). There is also noted a reference value P* for evaluating the number of drives for changed complementary nozzle. The reference value P* is set in advance in consideration of the number of drives with respect to the service life of the nozzle, and is usually selected within a range (50% of life)<P*<(100% of life).

In the following, there will be explained the method of complementing the white streak 200a in case the number $P_3$ of drives of the complementary nozzle 203 exceeds the reference value P*, with reference to FIGS. 2A to 2F.

Figure 2A:
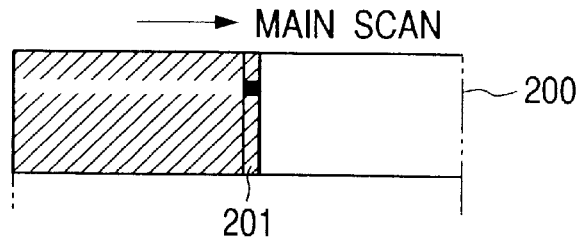
FIGS. 2A, 2B, 2C, 2D, 2E, and 2F are views showing the switching of a complementary nozzle in the first embodiment.
Figure 2B:
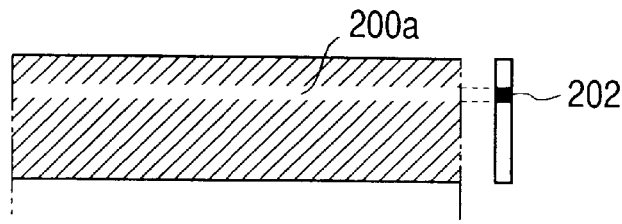

At first, as shown in FIG. 2A, the printing head 201 executes a main scan to print the printing area 200, in the same manner as in FIG. 1A. As a result, as shown in FIG. 2B, the printing area 200 shows a white streak 200a corresponding to the defective nozzle 202.

Figure 2C:
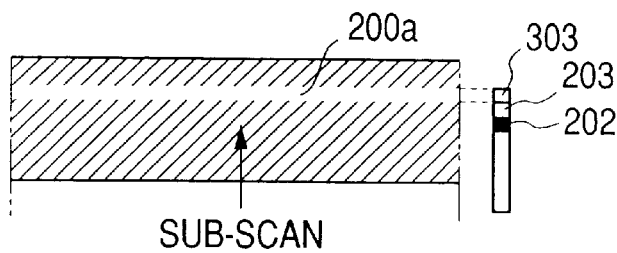

Then, the sub-scan for the complementary recording of the width corresponding to the defective nozzle 202 is made by an integral multiple of the width of the sub-scan explained in the foregoing. As a result, as shown in FIG. 2C, a new satisfactory nozzle, which is different from the nozzle that has been used as the complementary nozzle 203, is positioned corresponding to the white streak 200a and is used as a new complementary nozzle 303.

Figure 2D:
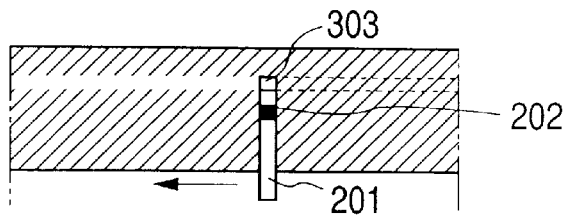
Figure 2E:
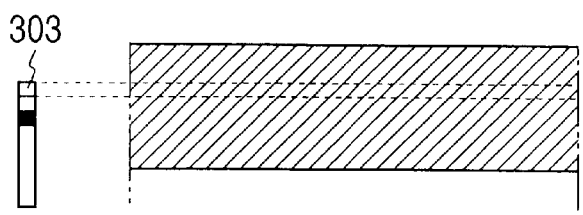
Figure 2F:
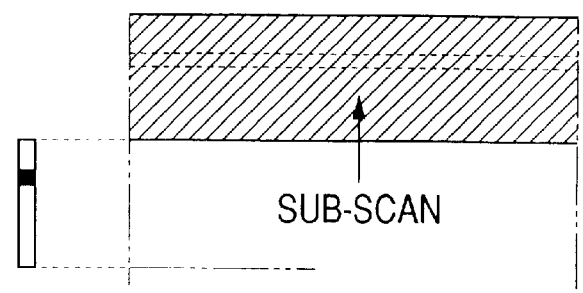

Then, as shown in FIGS. 2D to 2F, the white streak 200a is complemented by the new complementary nozzle 303 in the reverse scan of the printing head 201 and a sub-scan in made for enabling the printing in a next printing area in the same manner as in the complementary printing explained in the foregoing, and the above-explained steps are thereafter repeated. The amount of sub-scan shown in FIG. 2C is selected as an integral multiple of that explained in the foregoing, but such amount is not limited and can be arbitrarily selected as long as a satisfactory nozzle different from the previously used complementary nozzle 203 can be positioned anew corresponding to the white streak 200a.

As explained in the foregoing, a defect-free satisfactory image can be obtained even with a printing head including a nozzle with abnormality such as failed ink discharge, by executing the recording in a main scan with satisfactory nozzles excluding the defective nozzle 202, then executing a sub-scan so as to enable recording the unrecorded area with another satisfactory nozzle, and executing a complementary recording in the reversing motion of the printing head 201.

Also, there is not required a particular head for the complementary recording, and the configuration of a recording apparatus is not made complex. Besides, a satisfactory image can be obtained without sacrificing the recording speed, by a mere sub-scan of a certain amount prior to the reversing motion of the printing head.

Furthermore, as the nozzle used for complementary recording is not fixed but switched to other nozzles based on a predetermined number of drives, the frequency of drives is dispersed among the nozzles and the service life of the head is not shortened.

[Second embodiment]

FIGS. 3A to 3D illustrate a second embodiment of the present invention, showing a situation where a defective nozzle 202 is generated, among the plural nozzles of the printing head 201, at the downstream side in the sub-scanning direction.

Figure 3A:
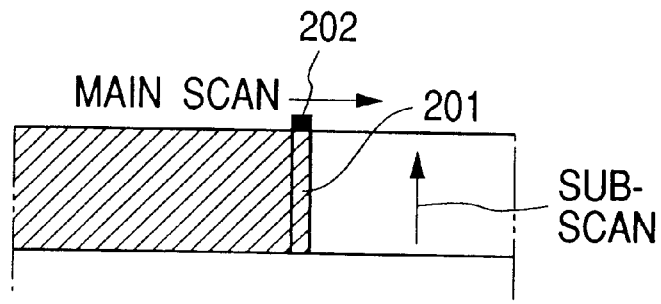
FIGS. 3A, 3B, 3C and 3D are views showing a second embodiment of the present invention.
Figure 3B:
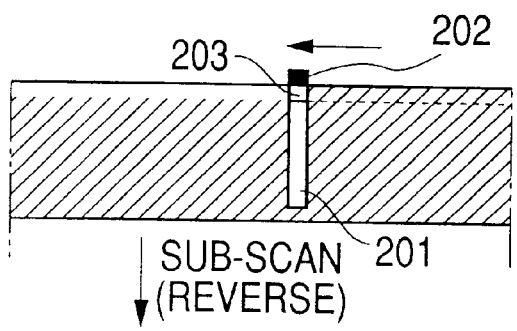

In case the defective nozzle 202 is generated at the downstream side, at first a row is printed without the image data corresponding to the defective nozzle 202 as shown in FIG. 3A. Then, as shown in FIG. 3B, a sub-scan is executed in the opposite direction, in order to print the area that has not been printed because of the defective nozzle 202, whereby a satisfactory nozzle is opposed as the complementary nozzle 203 to the unprinted area. Then, complementary printing of the image data that have not been printed in the preceding main scan is executed with the complementary nozzle 203 in the reversing motion of the printing head 201, whereby a defect-free image can be obtained.

Figure 3C:
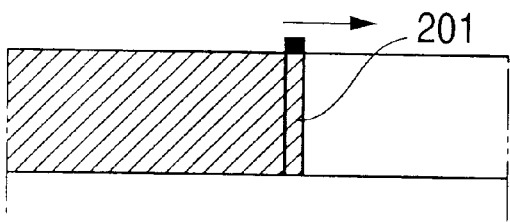
Figure 3D:
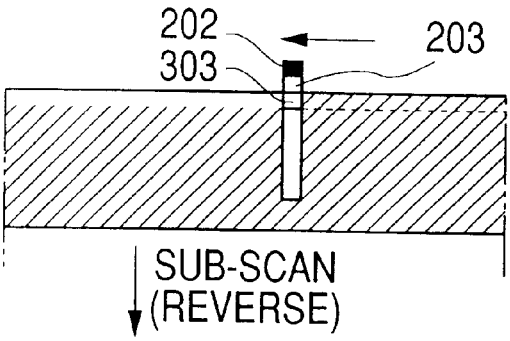

In case the number $P_3$ of drives of the complementary nozzle 203 exceeds the reference value P*, at first a row is printed as shown in FIG. 3C, in the same manner as in FIG. 3A. Then, the sub-scan in the opposite direction, for complementary printing in the reverse scan motion of the printing head 201, is made by an amount corresponding to an integral multiple of the sub-scan explained in the foregoing, as shown in FIG. 3D. As a result, a new satisfactory nozzle, which is different from the nozzle that has been used as the complementary nozzle 203, is positioned corresponding to the area that has not been printed in the preceding main scan, and is used as the new complementary nozzle 303. The amount of sub-scan is selected as an integral multiple of that explained in the foregoing, but such amount can be arbitrarily selected as long as a satisfactory nozzle different from the previously used complementary nozzle 203 can be used. The effects of the present embodiment are similar to those of the foregoing first embodiment.

[Third embodiment]

In the following there will be explained a third embodiment of the present invention, with reference to FIGS. 4A to 4D.

FIGS. 4A to 4D illustrate the third embodiment of the present invention, showing a situation where defective nozzles 202a, 202b are generated, among the plural nozzles of the printing head 201, at both end portions thereof.

In case the defective nozzles 202a, 202b are generated at the both ends of the printing head 201, at first a row is printed by reducing the printing width by only excluding the defective nozzle 202a at the downstream side in the sub-scanning direction. Then, as shown in FIG. 4B, a sub-scan for complementary recording is executed, and complementary printing of the margin at the upstream side, that have not been printed in the preceding main scan, is executed with the complementary nozzle 203 in the reversing motion of the printing head 201.

Figure 4A:
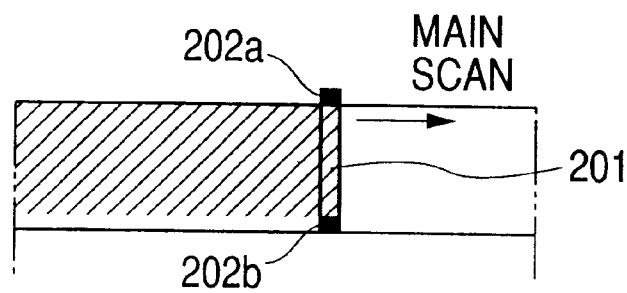
FIGS. 4A, 4B, 4C and 4D are views showing a third embodiment of the present invention.
Figure 4B:
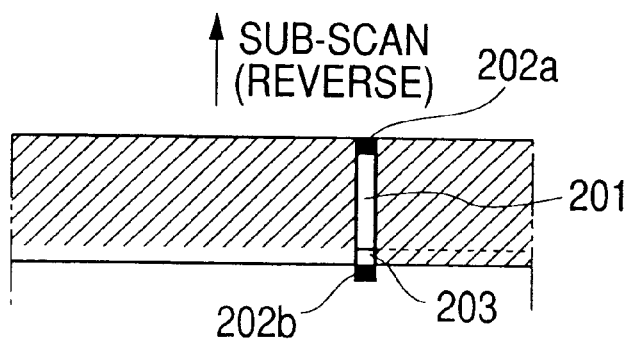
Figure 4C:
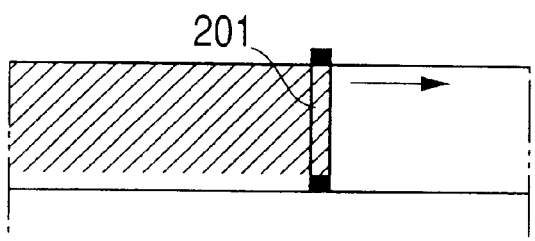
Figure 4D:
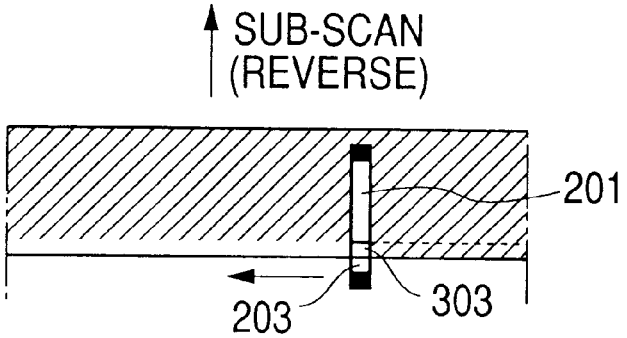

In case the number $P_3$ of drives of the complementary nozzle 203 exceeds the reference value $P^*$, at first a row is printed as shown in FIG. 4C, in the same manner as in FIG. 4A. Then, the amount of the sub-scan for complementary printing is varied and the complementary printing is executed with the new complementary nozzle 303 which is different from the nozzle which has been employed as the complementary nozzle 203 in the reverse scan motion of the printing head 201.

In the present embodiment, the sub-scan for the complementary printing is executed in the forward direction, but it may also be made in the opposite direction, as in the second embodiment, in such a manner that the area which has not been printed by the defective nozzle can be printed with a satisfactory nozzle. In consideration of the amount of sub-scan after the complementary printing, a sub-scan in the forward direction prior to the reverse main scan motion allows to reduce the amount of sub-scan prior to the next forward main scan motion, thereby improving the throughput of recording. It is also possible to vary the direction of sub-scan prior to the complementary printing, according to the number of the defective nozzles. It is furthermore possible to alternate the direction of sub-scan prior to the complementary printing, thereby averaging the frequency of use of the nozzles within the printing head and extending the service life thereof.

As explained in the foregoing, a defect-free satisfactory image can be obtained even with a printing head including a nozzle with abnormality such as failed ink discharge.

Also, there is not required a particular head for the complementary recording, and the configuration of the recording apparatus is not made complex. Besides, a satisfactory image can be obtained without sacrificing the recording speed, by a mere sub-scan of a certain amount prior to the reversing motion of the printing head.

[Fourth embodiment]

In the following there will be explained a fourth embodiment of the present invention, with reference to FIGS. 5A to 5D.

FIGS. 5A to 5D illustrate the fourth embodiment of the present invention, showing a situation where defective nozzles 202a, 202b are generated, among the plural nozzles of the printing head 201, in an intermediate portion thereof.

Figure 5A:
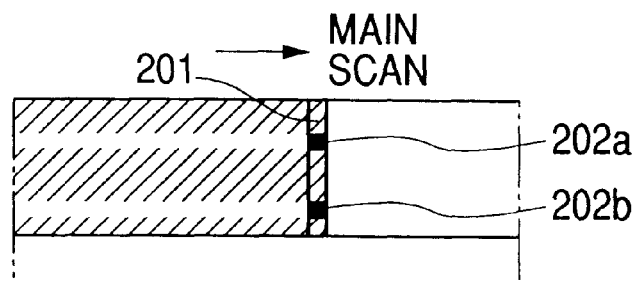
FIGS. 5A, 5B, 5C and 5D are views showing a fourth embodiment of the present invention.
Figure 5B:
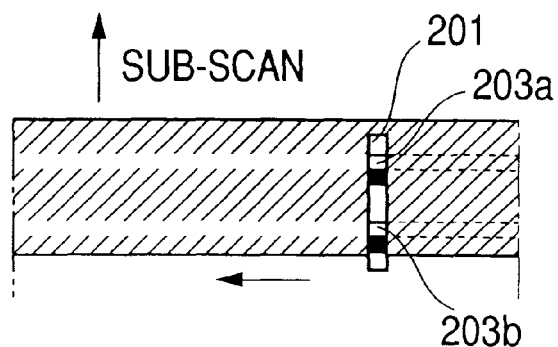

Also in case plural defective nozzles 202a, 202b are generated, the complementary printing can be achieved in a similar manner as in the first embodiment. At first, as shown in FIG. 5A, a row is printed by excluding the image data corresponding to the defective nozzles 202a, 202b. Then, as shown in FIG. 5B, a sub-scan is executed in such a manner that the unprinted areas can be printed with satisfactory complementary nozzles 203a, 203b, and complementary printing is executed with the complementary nozzles 203a, 203b in the reversing motion of the printing head 201.

Figure 5C:
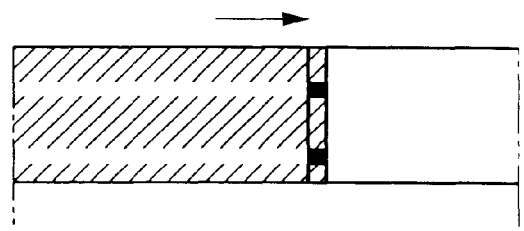
Figure 5D:
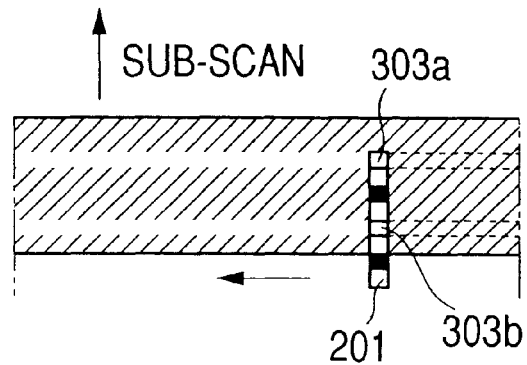

In case the number $P_3$ of drives of the complementary nozzles 203a, 203b exceeds the reference value $P^*$, at first a row is printed as shown in FIG. 5C, in the same manner as in FIG. 5A. Then, the amount of the sub-scan for complementary printing is so varied that the unprinted areas can be printed with new complementary nozzles 303a, 303b, and the complementary printing is executed with the new complementary nozzles 303a, 303b in the reverse scan motion of the printing head 201.

When the defective printings by the defective nozzles 202a, 202b of plural positions are complemented by the complementary nozzles 203a, 203b of the respectively corresponding plural positions, the largest one of the numbers of drives of the complementary nozzles 203a, 203b is selected as the number $P_3$ of drives.

However, depending on the position of the defective nozzle, it may become difficult to obtain a completely defect-free image by the complementary printing explained in the foregoing embodiments.

Figure 6:
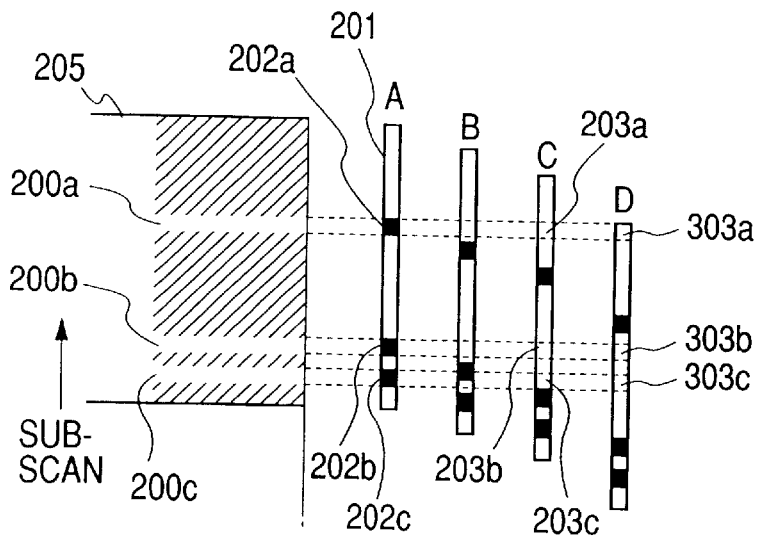
FIG. 6 is a view showing a case in the fourth embodiment in which the position of an undischarging nozzle is different from that shown in FIGS. 5A to 5D.

As an example, FIG. 6 shows a case in which the printing head has defective nozzles 202a, 202b, 202c in three positions, among which two defective nozzles 202b, 202c are positioned mutually close. In FIG. 6, A to D indicate different relative positions of the printing head 201 in the sub-scanning direction, with respect to the recording medium 205.

At first, printing in the position A generates, on the recording medium 205, white streaks 200a, 200b, 200c corresponding to the positions of the defective nozzles 202a, 202b, 202c. If the sub-scan is made by the width of the largest white streak 200a as in the foregoing embodiments and the complementary printing is executed in the relative position B, complete complementary printing cannot be achieved since the defective nozzle 202b overlaps with the white streak 200c. A defect-free image can be obtained by so executing the sub-scan further as to avoid such overlapping and effecting the complementary printing with the complementary nozzles 203a, 203b, 203c in the relative position C.

In case the number $P_3$ of drives of the complementary nozzles 203a, 203b, 203c exceeds the reference value $P^*$, the amount of the sub-scan is varied and the complementary printing is executed with new complementary nozzles 303a, 303b, 303c in the relative position D.

As explained in the foregoing, a defect-free image can be obtained even in case plural defective nozzles are generated, by executing, after the main printing scanning operation, a sub-scan to a position where the complementary printing can be made with satisfactory nozzles.

Figure 7:
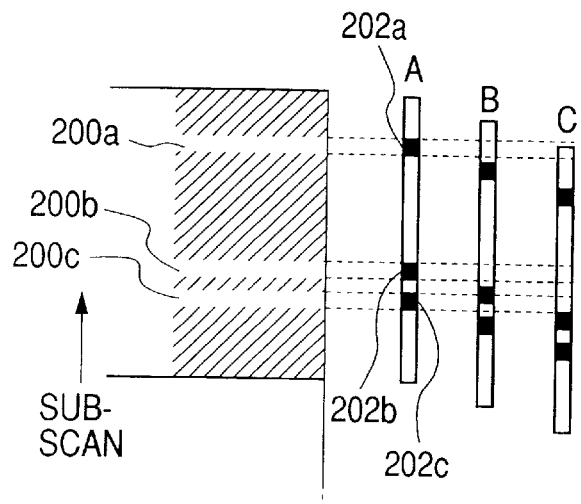
FIG. 7 is a view showing a case in the fourth embodiment in which the position of an undischarging nozzle is more difficult for complementary recording in comparison with that shown in FIG. 6.

FIG. 7 shows a case in which the defective nozzles are generated in positions more difficult for complementary printing than in the case shown in FIG. 6. More specifically, the defective nozzles 202a, 202b, 202c are generally positioned at the downstream side in the sub-scanning direction, in comparison with the example shown in FIG. 6.

If the sub-scan is made by the largest width of the white streaks 200a, 200b, 200c generated by the defective nozzles 202a, 202b, 202c to a relative position B in the same manner as in the example shown in FIG. 6, the unprintable area by the detective nozzle 202b partially overlaps with the white streak 200c. Then, if the sub-scan is further made by a corresponding amount to a relative position C, a part of the white streak 200a at the downstream side overflows from the area of the nozzles and cannot therefore be printed. In such case, the complementary printing for the defective nozzles 202a, 202b, 202c cannot be achieved, and an alarm therefore is issued and the function of the apparatus is terminated.

If the function of the apparatus cannot be stopped in the course of printing, the unprinted area may be complemented by repeating plural sub-scans and main scans. Such process lowers the throughput of printing, but allows to obtain a defect-free satisfactory image without interrupting the printing operation.

Figure 8:
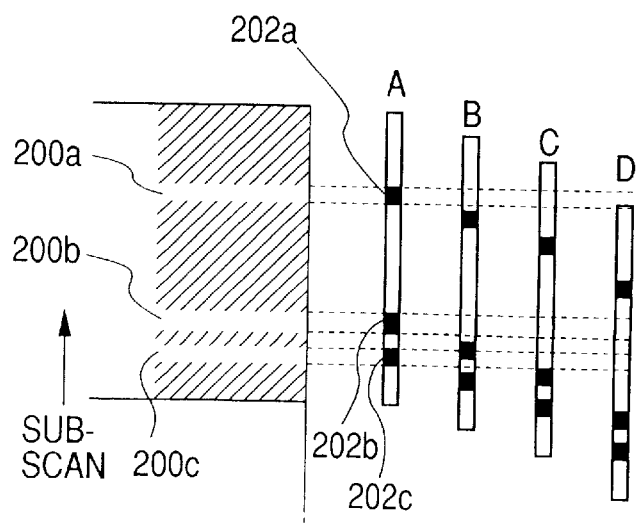
FIG. 8 is a view showing the switching of the complementary recording nozzle in an example shown in FIG. 7.

Similarly, FIG. 8 shows a situation where the white streaks 200a, 200b, 200c generated by the defective nozzles 202a, 202b, 202c can be complemented in a relative position C, but a part of the white streak 200a at the downstream side cannot be complemented in a relative position D adopted for the new complementary nozzles in case the number $P_3$ of drives of the complementary nozzles exceeds the reference value P*. Also, in such case, the complementary printing for the defective nozzles 202a, 202b, 202c cannot be achieved, and an alarm therefor is issued and the function of the apparatus is terminated. If the function of the apparatus is difficult to be stopped in the course of printing, the unprinted area may be complemented by repeating plural sub-scans and main scans.

In the foregoing first to fourth embodiments, the switching of the complementary nozzles is executed according to the number of pulses corresponding to the frequency of drives of the nozzle, but such switching may also be achieved according to the number of main scans. More specifically, there are calculated the number $N_1$ of the main scans, the number $N_2$ of the main scans for complementary printing, the summed number $N_3$ of the main scans (=$N_1$+$N_2$), and a reference number N* of scans, and the complementary nozzles are switched in case a relationship $N_3$>N* for any of the complementary nozzles.

The reference number N* of scans is correlated with the reference value P* of the number of drives. More specifically, for a main scanning width D (mm) to be printed and a print density A (dpi) of the image, there stands a relationship:

$$N^* = P^* \times \{25.4/(A \times D)\}$$

As a specific example, for a reference drive number $P^* = 10^9$ times, a print density A=360 dpi and a main scanning width D=1200 mm, there is obtained:

$$N^* = 10^9 \times \{25.4/(360 \times 1200)\} \approx 59000.$$

Thus there is discriminated whether the number $N_3$ of scans exceeds such reference number N*. Such method only provides an approximate number of drives in comparison with the foregoing method of exactly counting the number of drives of the nozzle in each main scanning operation, but provides an advantage of simplifying the counting circuit, as the memory capacity required therein is reduced.

[Fifth embodiment]

Figure 9:
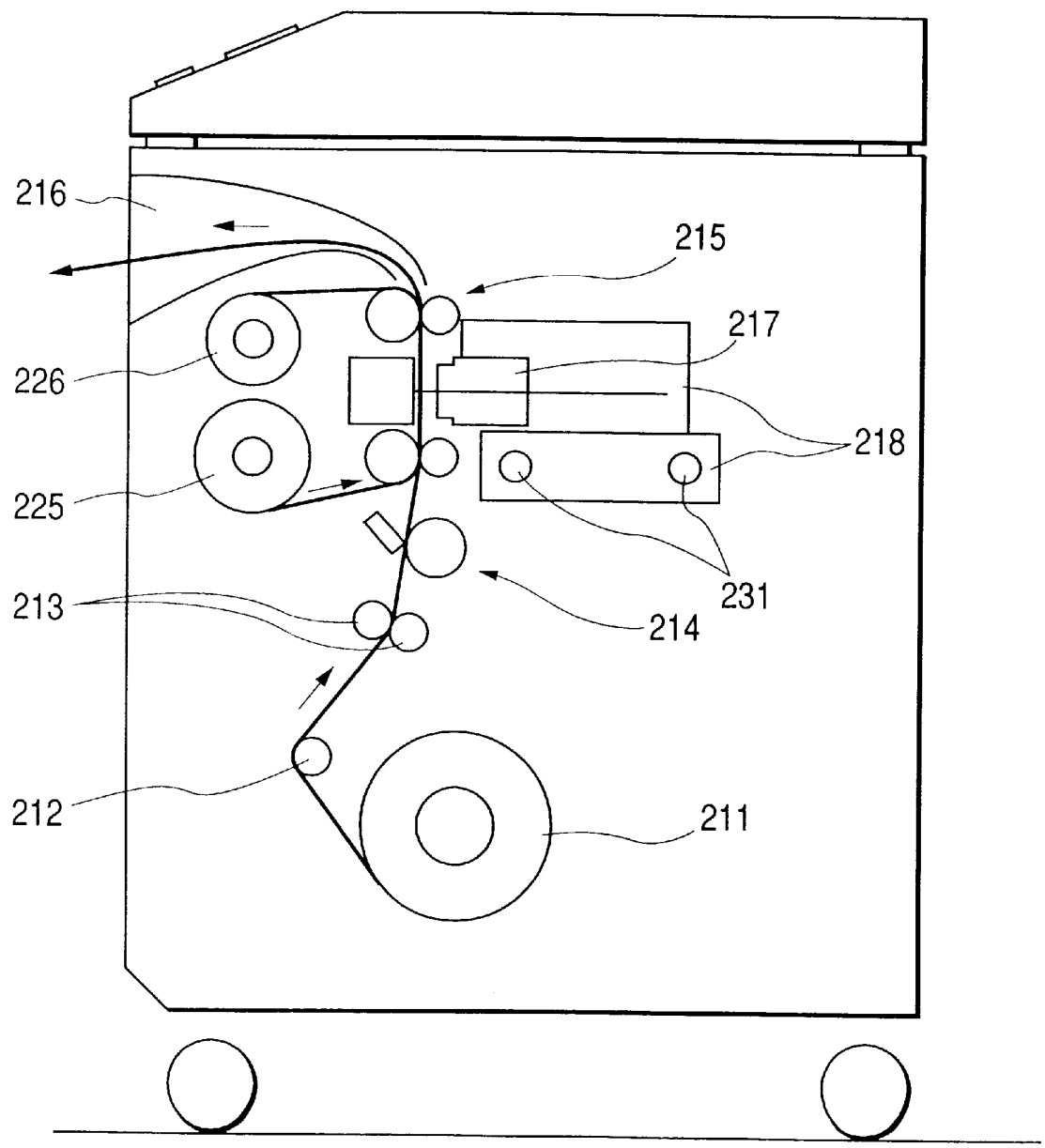
FIG. 9 is a schematic cross-sectional view of a direct printing apparatus constituting a fifth embodiment of the present invention.
Figure 10:
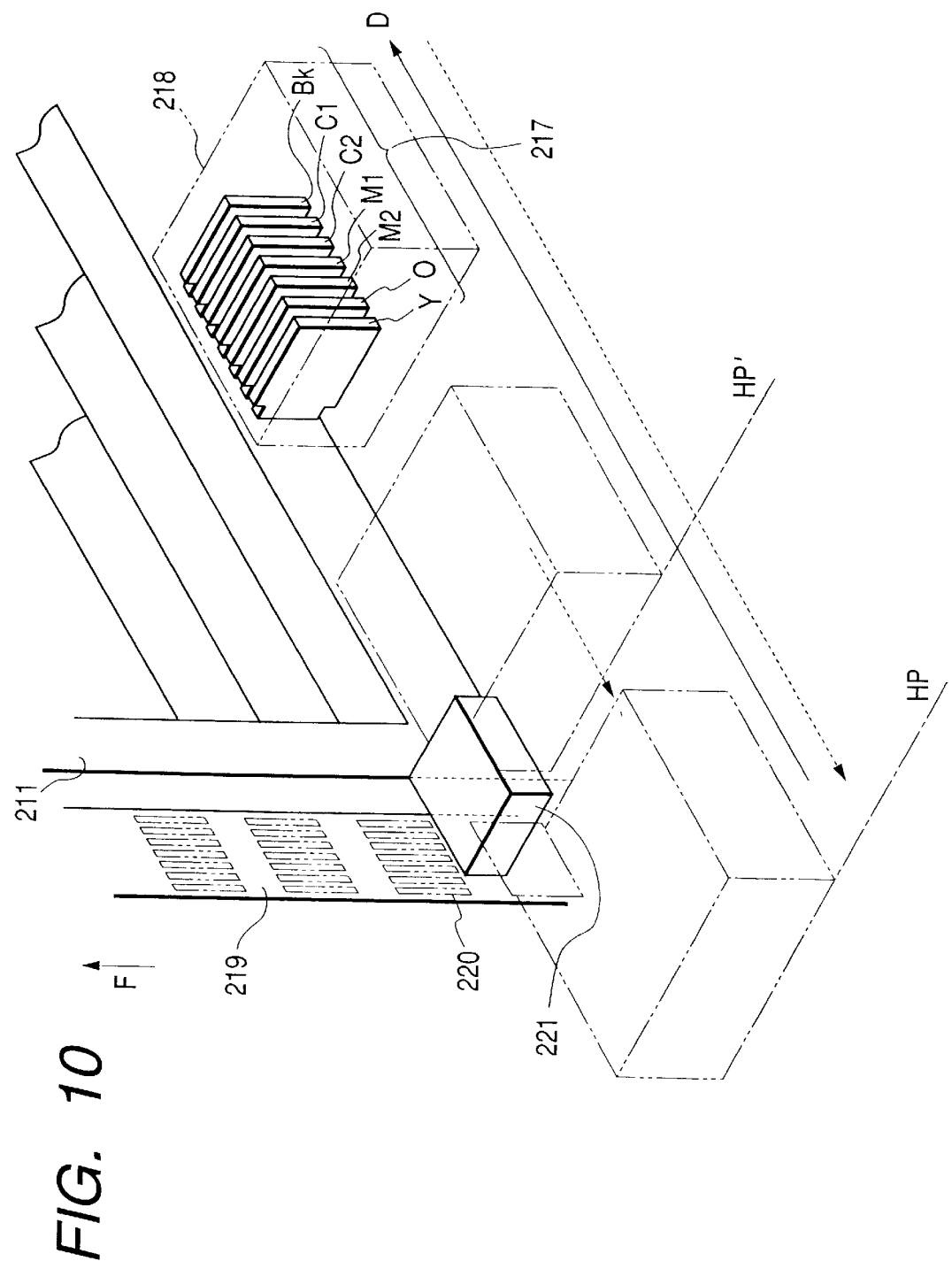
FIG. 10 is a schematic perspective view of a recording unit of the direct printing apparatus shown in FIG. 9

FIG. 9 is a schematic cross-sectional view of a direct printing apparatus in which the present invention is applicable, and FIG. 10 is a schematic perspective view of a printing unit thereof.

In the following, there will be given a detailed explanation on a recording apparatus adaptable to the foregoing embodiments, a defective nozzle detecting device, and a control process from the detection of the defective nozzle to the complementary recording therefor, with reference to these drawings.

A rolled printing sheet 211, loaded in the lower part of the main body of the apparatus shown in FIG. 9, is supplied to a printing unit 215 by a guide roller 212 and feed rollers 213, through a cutter 214 for cutting into a suitable length. The printing sheet 211 supplied to the printing unit 215 is printed therein and is discharged from an exit aperture 216.

Now the printing unit 215 will be explained in detail with reference to FIG. 10.

A printing head array 217 is composed of plural ink jet printing heads for printing respectively different colors. There are printed seven colors, namely black Bk, cyan C1, special cyan color C2, magenta M1, special magenta color M2, special orange color O and yellow Y. The special colors are difficult to obtain by the mixture of conventional four colors (Bk, Y, M, C), and are provided to precisely reproduce such difficult colors in the recorded image and to expand the color reproduction range thereof. The printing head array 217 is integrally loaded in a scanning carriage 218 linearly guided by a rail 231 (cf. FIG. 9).

The head array 217 executes a forward motion (main scan) with printing operation, from the left-hand end to the right-hand end in a direction D (main scanning direction) in FIG. 10, and a reverse motion from the right-hand end to the left-hand end. After the printing of a row, the printing sheet 211 is advanced, in a direction F (sub-scanning direction), by the width of printing (sub-scan), in preparation for the printing of a next row.

At a side of the printing sheet 211, there is provided an abnormality detecting sheet 219 bearing abnormality detecting patterns 220. The abnormality detecting sheet 219 is supplied, independently from the printing sheet 211, intermittently from a supply roller 225 shown in FIG. 9 through the printing unit 215 and is taken up on a roller 226, for the purpose of reading for defective nozzle detection as will be explained later. The abnormality detecting pattern 220 is printed by the printing heads when the head array 217 is moved to a position corresponding to the abnormality detecting sheet 219, and each color is printed with a density corresponding to a duty ratio of about 100% in order to facilitate detection of the abnormality.

Figure 11:
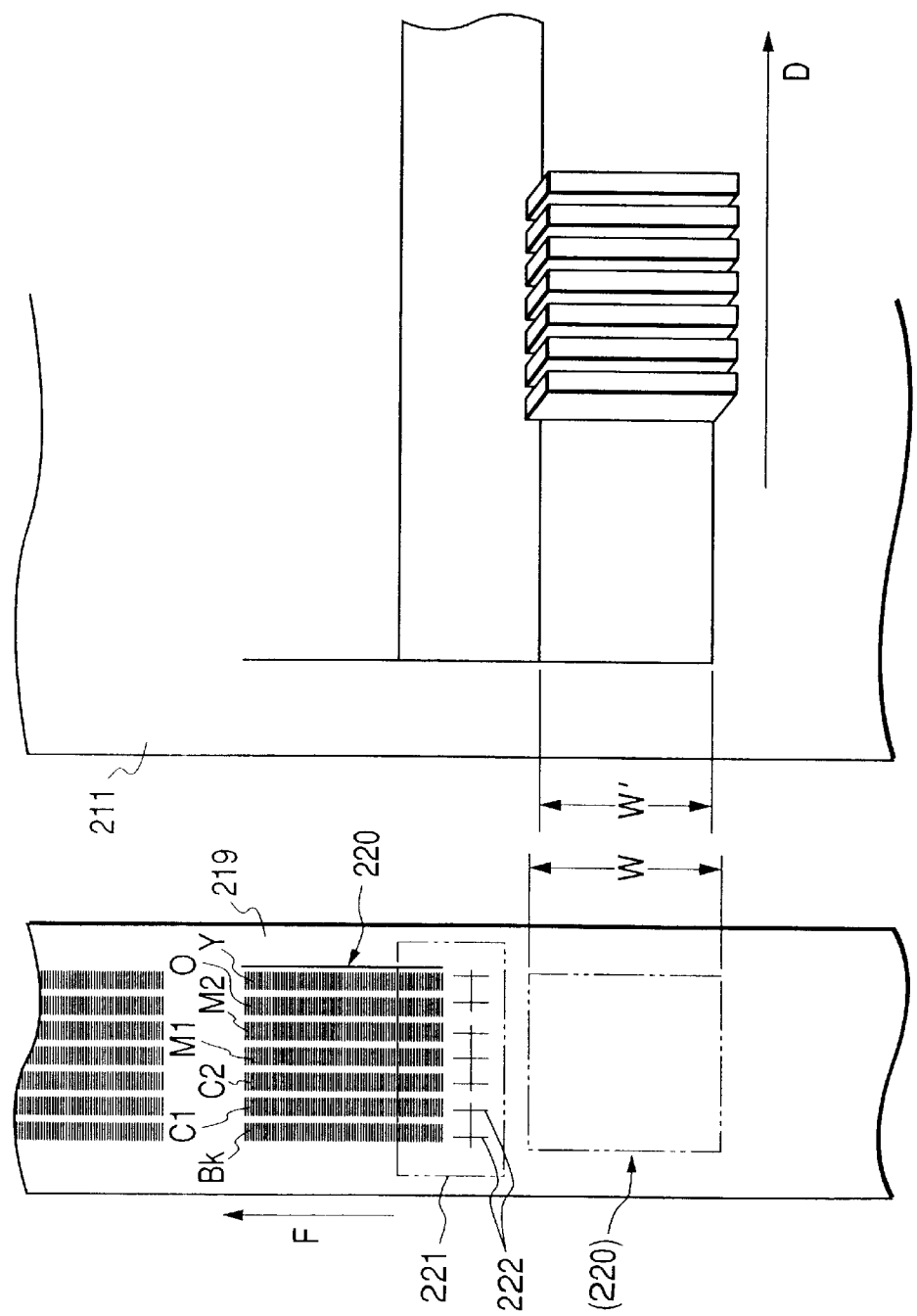
FIG. 11 is a view showing a configuration for detecting an abnormal nozzle in the recording unit shown in FIG. 10.

On the other hand, the printing sheet 211 is advanced in the sub-scanning direction F with a precise pitch of the printing width W' as shown in FIG. 11, and is so printed that the consecutive rows are continued.

The abnormal nozzle detecting device for detecting the defective nozzle can be that proposed by the present applicant in the Japanese Patent Application Laid-open No. 6-79956.

The abnormal nozzle detecting device disclosed in the Japanese Patent Application Laid-open No. 6-79956 has sufficient ability for detecting a defective nozzle. The device is capable of detecting each discharged dot and identifying lack of discharge, skewed discharge or discharge of an excessively large or small dot in each nozzle, so that, even if a number of abnormalities are present in the nozzles, there is reduced the probability of overlapping between the white streak generated in the main scanning operation and the abnormal nozzle in the complementary recording and the complementing function can be maintained for a prolonged period.

Furthermore, the present invention provides a method of detecting an abnormal nozzle with a further simpler configuration, as will be explained in the following with reference to FIGS. 10 to 12.

An abnormal nozzle detecting device 221 is opposed to the abnormality detecting sheet 219, and is provided, for optically reading the abnormality detecting pattern 220, with reading units respectively opposed to the different colors of the abnormality detecting pattern 220 and having reading centers 222 respectively positioned on the moving lines of the patterns of the different colors. Each reading unit is composed, as shown in FIGS. 2A to 2F, of a lamp 223 and an optical light receiving element 224, and has a small vertical width for detecting a defective nozzle and a larger reading width in the main scanning direction in order to average the fluctuation of dots from a same nozzle. However, the vertical width need not necessarily be so small as to distinguish the prints from the individual nozzles.

Figure 12:
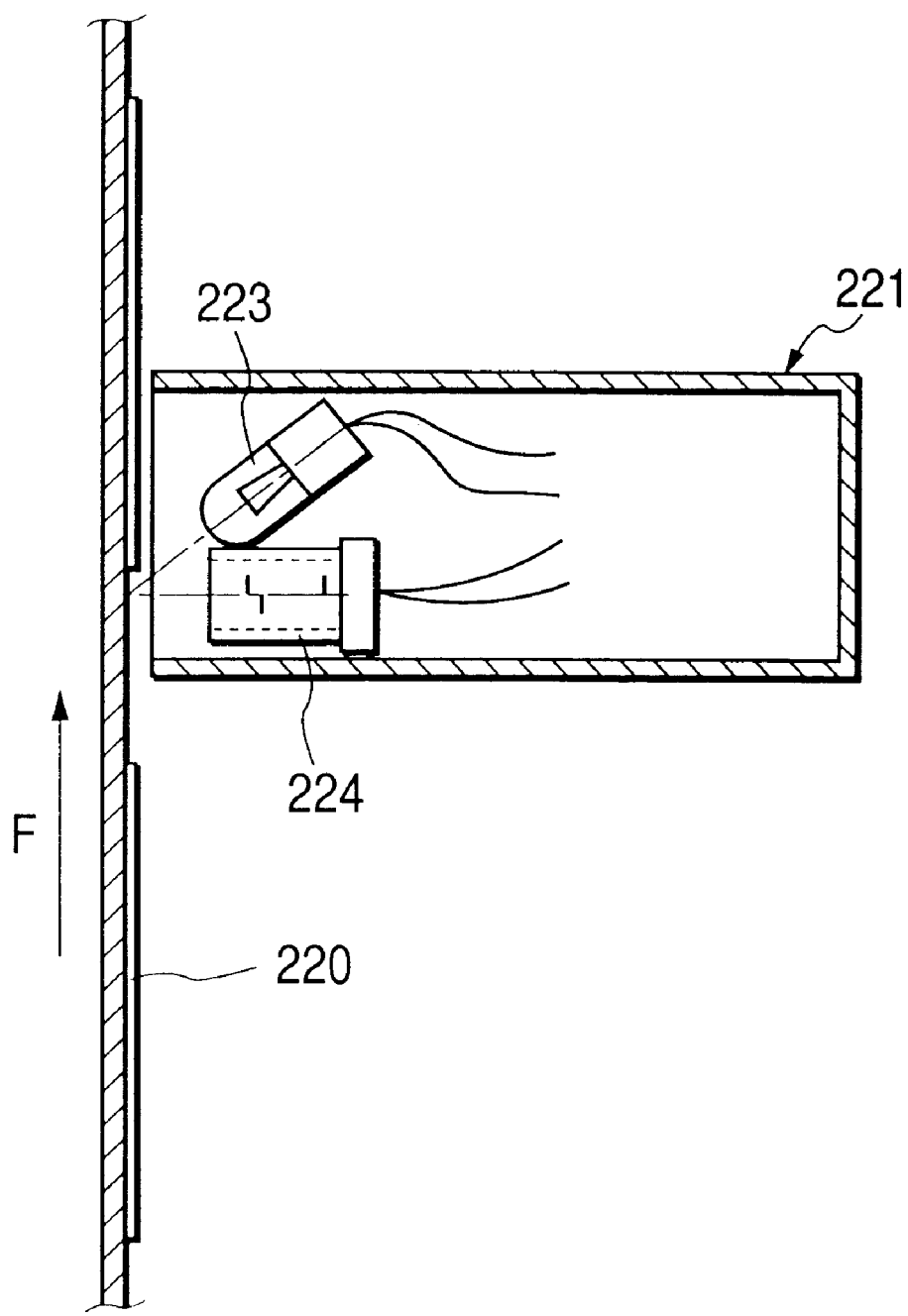
FIG. 12 a cross-sectional view of an abnormal nozzle detecting device in the recording unit shown in FIG. 10.

As explained in the foregoing, the abnormality detecting pattern 220 passes in a direction F shown in FIGS. 11 and 12, in front of the fixed abnormal nozzle detecting device 221, and the abnormal nozzle is detected by density reading of such pattern.

Figure 13:
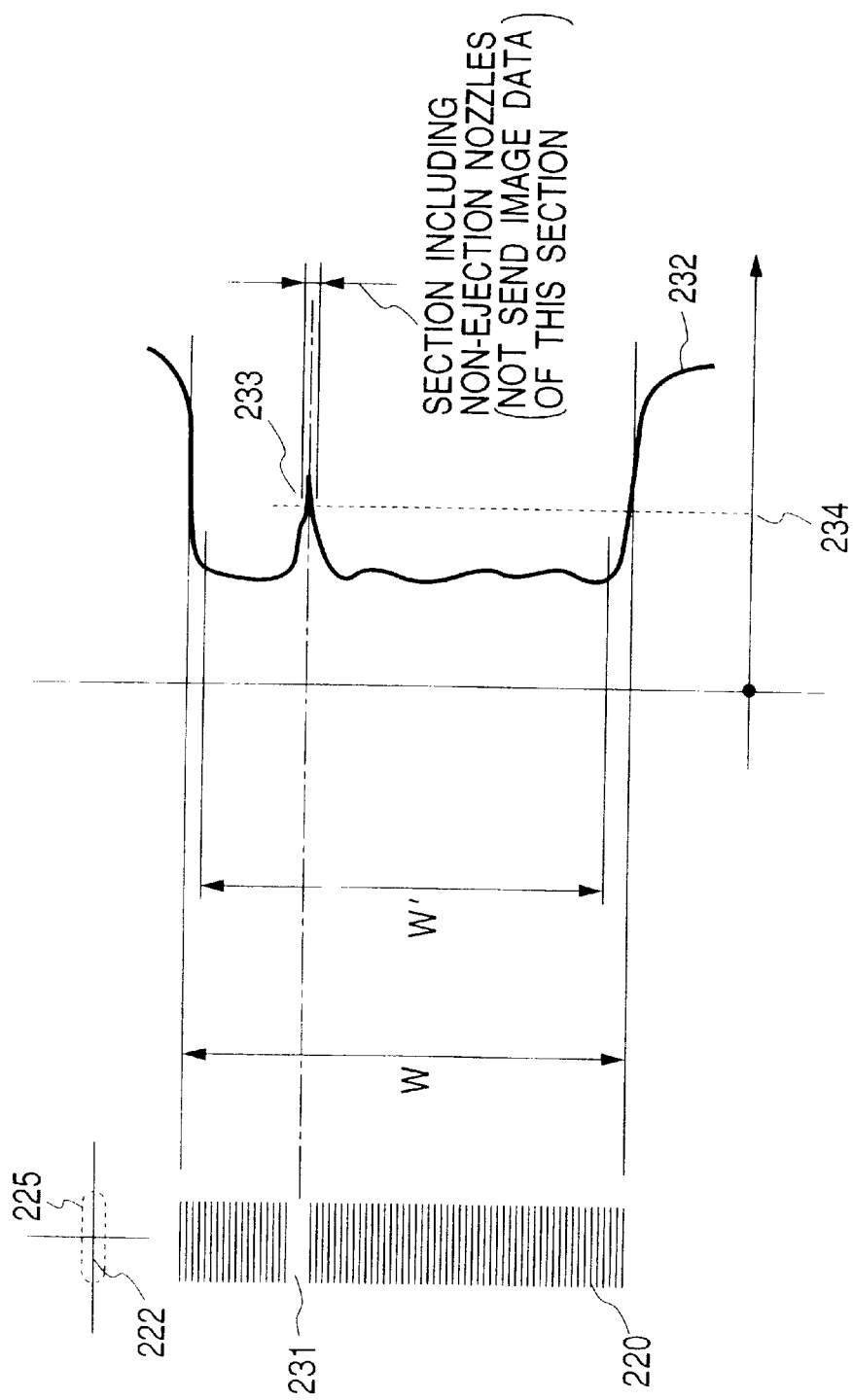
FIG. 13 is a view showing an example of the output read by the abnormal nozzle detecting device shown in FIG. 12.

FIG. 13 shows an example of the read output of the light receiving element. If a nozzle without discharge is present, a defective portion 231 is generated in the abnormality detecting pattern 220. The defective portion 231, being very small in comparison with the reading area 225, generates a corresponding portion 233 in the output 232. There is selected a level 234 for judging the lack of discharge, and a portion showing a larger output (stronger reflected light from the detection pattern) is judged as an area where the defective nozzle is present. The result of such detection cannot identify the actual single nozzle lacking the discharge, but can identify several nozzles including the defective nozzle.

The abnormality detecting pattern 220 is printed with all the nozzles (width W), but the actually printing row has a width W' excluding the nozzles at both ends in the array of nozzles, where the outputs for abnormality detection show "sagged shoulders", and the defect in discharge can be detected even if it occurs at the end of such actual printing width W'. Although the detection cannot be made in exact manner for the several nozzles at the ends, the abnormal nozzle detecting device can be realized in a very simple manner as explained above and can identify the defective nozzles by a single optical scan with the optical sensor. Consequently, there can be reduced the time required from the pattern reading to the defect judgment, whereby the printing speed is not lowered and the cost performance of the apparatus can be improved.

It is also possible, even in the above-described abnormal nozzle detecting device, to detect the presence of defective nozzles at the end portions of the nozzle array of the printing head, by forming a detecting pattern continuous in the sub-scanning direction by two recording operations obtained by combining the recording operation and the sub-scanning operation and by detecting the junction of such detecting pattern.

FIGS. 14A, 14B, 15A and 15B are flow charts showing the control sequence from the detection of the defective nozzle to the complementary printing in the present embodiment. The flow charts in FIGS. 14A, 14B, 15A and 15B mutually connected at (A), (B), (C) and (D) therein.

At first, the printing operation is started (step S101) to print the abnormality detecting pattern 220 on the abnormality detecting sheet 219 (step S102). Referring to FIG. 10, the scanning carriage 218 once advances from a home position HP to a position HP', and prints the abnormality detecting pattern 220 on the sheet 219 in the course of return to the home position HP.

Upon completion of the printing of the abnormality detecting pattern 220, the abnormality detecting sheet 219 is fed in the direction F, and the abnormal nozzle detecting device 221 reads the abnormality detecting pattern 220 to obtain the read output shown in FIG. 13 (step S103). Then, based on the obtained output, the position and the width of the defective nozzle are determined for each color (step S104). If the defective nozzle is identified absent, a normal printing operation is executed by a main scan of the carriage 218 (step S118). The number $P_1$ of drives is counted for all the nozzles. After the printing, the abnormality detecting pattern 220 is printed for the next row (step S119), and a sub-scan is executed (step S120). Then there is determined, for each nozzle, the number $P_3$ of drives by adding the sum of the number $P_1$ of drives of the nozzle in the normal printing and that of the number $P_2$ of drives in the complementary printing (step S121). Then, there is discriminated whether a next row is to be printed (step S105), and, if not, the sequence is terminated, but, if to be printed, the abnormality detecting pattern 220 is read again (step S103).

If the step S104 detects a defective nozzle, there is discriminated whether the defective nozzle is at the downstream end of the head (step S106), and, if not at the downstream end, there is assumed a sub-scan for complementary printing by the largest width $L_1$ of the detected defective nozzles (step S107), and there is discriminated whether the white streak generated in the image recorded in the main scan overlaps with the defective nozzle in the complementary printing in the reversing motion (step S108).

If such overlapping is judged absent, there are determined the portion of the printing data to be eliminated from the nozzle array in the forward main scan and the amount of sub-scan for complementary printing, equal to the largest width of the detected defective nozzle or nozzles. Thereafter executed are the recording main scan, the sub-scan, and the complementary printing in the reverse main scan.

After the complementary printing, the printing sheet 211 is advanced in the sub-scanning direction by an amount corresponding to the feed amount of a row minus the amount of sub-scan prior to the complementary printing, in preparation for the printing of the next row. Then a step S105 discriminates whether the next row is to be printed.

If the step S108 identifies that the white streak area overlaps with the defective nozzle, there is assumed a sub-scan for complementary printing by an amount L2, which is equal to the sum of the sub-scanning amount L1 assumed in the step S107 and the amount of such overlapping (step S109). Then, there is discriminated whether the white streak, not recorded in the preceding recording operation, overlaps with the defective nozzle (step S110), and, in the absence of such overlapping, there is made discrimination on the downstream end of the nozzles (step S111). If the current relative position between the head and the recording area is acceptable, the sub-scan for complementary printing is determined as assumed above, and the printing and the complementary printing are thereafter executed as explained in the foregoing.

If the step S110 or S111 identifies that the exact complementary printing is not possible, an alarm is issued and the function of the apparatus is stopped (step S112).

A step S141 enters L1 or L2 respectively corresponding to the result N or Y of the step S108, as the sub-scanning amount L for complementary printing. Then, there is discriminated, for the nozzle employed for complementary printing, whether the total number $P_3$ of the drives up to this point exceeds the reference value P* (step S142). If not, there is executed the printing operation of a row, excluding the data corresponding to the defective nozzle (step S113), and the number $P_1$ of the drives of the nozzle is counted.

On the other hand, if the total number $P_3$ of drives exceeds the reference value P*, the amount of sub-scan for complementary printing is reset as an integral multiple of L determined in the step S141 (step S143). Thereafter, the amount L of sub-scan for complementary printing is set by a procedure corresponding to the steps S107–S112 (steps S144–S150), whereby the complementary nozzle is switched to a new nozzle. After the setting of the amount of sub-scan for complementary printing, there is executed the printing operation of a row, excluding the data corresponding to the defective nozzle (step S113), and the number $P_1$ of the drives of the nozzle is counted.

Then, executed is the sub-scan by the amount L for complementary printing, set as explained above (step S114), and there is executed complementary printing of the unrecorded data, in the reverse main scan motion (step S115). In this operation, the number $P_2$ of drives of the nozzle in the complementary printing is counted (step S116). After the complementary printing, the abnormality detecting pattern 220 is printed for the next row (step S116), and the sub-scan is executed (step S117), and the sequence proceeds to the step S121.

On the other hand, if the step S106 identifies that the defective nozzle is at the downstream end of the nozzle array of the printing head, such defective nozzle is considered non-existing and the printing operation is executed by correspondingly reducing the printing width of a row. After the step S122, the printing and the complementary printing are executed in a similar manner as explained in the foregoing.

In the foregoing description, the sub-scan for complementary printing is executed in the forward direction and where is discriminated whether the white streak generated in the image by the defective nozzle overlaps with the area of the defective nozzle in the complementary printing, but it is also possible to execute the sub-scan in the opposite direction and to calculate the appropriate amount of sub-scan or to utilizing both methods in combination.

The foregoing description of the control sequence has been limited to the printing head of a single color, but, in case of a full color printing apparatus with printing heads of plural colors, it is necessary to judge whether the largest width of defect can be selected as the amount of sub-scan for complementary printing on the detecting pattern of all the colors and whether the complementary printing can be appropriately executed, and to determine the amount of sub-scan for complementary printing becomes adequate for all the heads.

The above-described configuration for detecting the defective nozzle is applicable to any of the foregoing embodiments, and allows to appropriately complement the deterioration of the recorded image resulting from the defects in the nozzles with the detecting device of a simple configuration.

[Other embodiments]

In the foregoing embodiments, the nozzle with abnormality such as lack of discharge is detected by optical inspection of the printed pattern, but the present invention is not limited to such embodiments and is also applicable to a configuration for detecting the breakage of discharge heaters. The breakage of the discharge heater can be detected by inspecting the resistance of such heater, in an interval between the discharge pulses applied according to the image data in the course of the printing operation.

Such detection of heater breakage, if employed in combination, allows not only to detect the exact position of the defective nozzle but also to detect the position where such breakage occurs in case the breakage occurs in the course of printing of a row, thereby enabling an appropriate complementing operation and providing a defect-free image.

Also in the foregoing embodiments, the complementary printing is executed in the reversing motion of the printing head, but it is also possible to once return the printing head to the home position and to execute the complementary printing in another main scan for this purpose. Such configuration, though lower in the printing speed, allows to dispense with the procedure of reading the printing data in the reverse order in synchronization with the reverse scan. Also, in the color printing, the order of printing different colors in the complementary printing becomes same as that in the normal printing, whereby the color hue of the dots obtained by the complementary printing becomes same as that of the dots obtained in the normal printing, whereby the result of complementary printing becomes more satisfactory. Furthermore, there can also be adopted a configuration in which the operator can select either the complementary printing in the reverse scan or that in the forward scan, in consideration of the loss in the printing speed.

In case of using the ink jet printing method, the present invention brings about excellent effects, among various ink jet printing technologies, particularly in a printing head or a printing device of the type provided with means for generating thermal energy to be used for discharging ink and adapted to induce a state change of the ink by such thermal energy, namely a printing head or a printing device of so-called bubble jet system proposed by Canon Kabushiki Kaisha, since such system can achieve a higher density and a higher definition of the print.

As to its representative configuration and principle, for example the one practiced by the use of the basic principle disclosed in the U.S. Pat. Nos. 4,723,129 and 4,740,796 is preferred. This system is applicable to either of the so-called on-demand type and the continuous type. Particularly the case of the on-demand type is effective because, by applying at least one driving signal which gives rapid temperature elevation exceeding nucleus boiling corresponding to the recording information on an electrothermal converting member arranged corresponding to the sheets or liquid channels holding liquid (ink), thermal energy is generated at the electrothermal converting member to induce film boiling at the heat action surface of the printing head, and a bubble can be consequently formed in the liquid (ink) corresponding one-to-one to the driving signals. By discharging the liquid (ink) through a discharge opening by the growth and shrinkage of the bubble, at least a droplet is formed. By forming the driving signals into pulse shapes, growth and shrinkage of the bubble can be effected instantly and adequately to accomplish more preferable discharging of the liquid (ink) particularly excellent in the response characteristics. As the driving signals of such pulse shapes, those disclosed in the U.S. Pat. Nos. 4,463,359 and 4,345,262 are suitable. Further excellent recording can be performed by employment of the conditions described in the U.S. Pat. No. 4,313,124 of the invention concerning the temperature elevation rate of the above-mentioned heat action surface.

As the configuration of the printing head, in addition to the combinations of the discharging orifice, liquid channel and electrothermal converting member (linear liquid channel or right-angled liquid channel) as disclosed in the above-mentioned respective specifications, the configuration by the use of the U.S. Pat. Nos. 4,558,333 and 4,459,600 disclosing the configuration having the heat action portion arranged in the flexed region is also included in the present invention. In addition, the present invention can also be effectively applied to the configuration of the Japanese Patent Application Laid-open No. 59-123670 using a slit common to a plurality of electrothermal converting members as the discharging portion of the electrothermal converting members or of the Japanese Patent Application Laid-open No. 59-138461 having the opening for absorbing a pressure wave of thermal energy corresponding to the discharging portion. This is because the present invention can achieve secure and efficient recording, regardless of the configuration of the printing head.

Furthermore, the printing head can naturally be constructed according to the form of the printing device, and, in so-called line printer, the discharge openings can be arranged over a range corresponding to the width of the printing medium. Besides, the present invention is effective, in the printing device of the serial type mentioned above, in a printing head fixed to the main body of the printing device, or an exchangeable chip-type printing head enabling electrical connection with the main body of the printing device or ink supply from such main body by being mounted on the main body, or the printing head of a cartridge type in which an ink tank is integrally provided in the printing head itself.

Also, in the configuration of the printing device of the present invention, the addition of discharge restoration means for the printing head, other auxiliary means etc. is preferable, because the effect of the present invention can be further stabilized. Specific examples of these include capping means, cleaning means, pressurization or aspiration means, preliminary heating means for effecting heating by an electrothermal converting member, another heating element or a combination thereof, and preliminary discharge means for effecting an idle discharge independent from that for printing.

Furthermore, though the foregoing embodiments employ liquidous ink, the present invention may also employ ink which is solid below room temperature but softens or liquefies at room temperature, or which is liquid at the application of the print signals since, in the ink jet recording, the ink is ordinarily temperature controlled within a temperature range from 30° C. to 70° C. to maintain the ink viscosity within a stably dischargeable range. Besides, there may be employed ink liquefied by thermal energy provided corresponding to the recording signal, such as the ink in which the temperature elevation by thermal energy is intentionally absorbed by the state change from solid to liquid, or the ink which remains solid in the unused state for the purpose of prevention of ink evaporation. Thus, the present invention is applicable to also to the case of liquefying the ink by the thermal energy provided corresponding to the recording signal and discharging thus liquefied ink, or the case of using ink which starts to solidify upon reaching the recording medium. In these cases, the ink may be supported as solid or liquid in recesses or holes of a porous sheet, as described in the Japanese Patent Application Laid-open Nos. 54-56847 and 60-71260, and placed in an opposed state to the electrothermal converting member. The present invention is most effective when the above-mentioned film boiling is induced in the ink of the above-mentioned forms.

Furthermore, the ink jet recording apparatus of the present invention may assume the form an image output terminal for an information processing equipment such as a computer, or a copying apparatus combined with a reader or the like.

Furthermore, the present invention is generally applicable to an ink jet cloth printing apparatus for printing on cloth with the ink jet recording method. In comparison with the conventional screen printing apparatus, the ink jet cloth printing apparatus is capable of high-speed printing on cloth according to print data (image, characters, color etc.), effectively utilizing the features of the ink jet recording method.

Because of the special application for printing on cloth, the apparatus is required to have industrial characteristics such as a high printing speed, a low cost, a long service life and ease of maintenance. For this reason, the complementary printing technology of the present invention, enabling printing of defect-free image in continuous manner, provides excellent effects in the speed of printing and in the cost performance.

Also, the cloth for ink jet printing is required to have various characteristics such as:

1) ability to develop a sufficient density by the ink;
2) ability to achieve a high fixation rate of the ink;
3) rapid drying of ink on the cloth;
4) little irregular blotting of ink on the cloth; and
5) excellent transportability in the apparatus.

For meeting these requirements, the cloth may be subjected, in the present invention, to a pre-treatment if necessary. For example the Japanese Patent Application Laid-open No. 62-53492 discloses a cloth having an ink receiving layer, and the Japanese Patent Publication No. 3-46589 proposes a cloth impregnated with a reduction preventing agent or an alkaline substance. The example of such pre-treatment includes a process of impregnating the cloth with a substance selected from alkaline substances, water-soluble polymers, synthetic polymers, water-soluble metal salts, urea and thiourea.

Examples of the alkaline substances include alkali metal hydroxides such as sodium hydroxide or potassium hydroxide; amines such as mono-, di- or triethanolamine; alkali metal carbonates or bicarbonates such as sodium carbonate, potassium carbonate or sodium bicarbonate; metal salts of organic acids such as calcium acetate or barium acetate; ammonia and compounds thereof. There can also be employed sodium trichloroacetate which becomes alkaline under steaming or dry heating. Particularly preferred alkaline substances are sodium carbonate and sodium bicarbonate, employed in dyeing with reactive dyes.

Examples of the water-soluble polymers include starch substances such as of corn or wheat; cellulose substances such as carboxymethyl cellulose, methyl cellulose or hydroxyethyl cellulose; polysaccharides such as sodium alginate, gum Arabic, locust bean gum, tragacanth gum, guaiac gum or tamarind seed; protein substances such as gelatin or casein; and water-soluble natural polymers such as tannin or lignin.

Also example of the synthetic polymers include polyvinyl alcohols, polyethylene oxides, water-soluble acrylic polymers and water-soluble maleic anhydrides. Among these, particularly preferred are polysaccharide polymers and cellulosic polymers.

The water-soluble metal salt can be a compound forming a typical ionic crystal and showing a pH value in a range of 4–10, such as halides of alkali metals or alkali earth metals. Typical examples of such compound include, for alkali metals, NaCl, $Na_2SO_4$, KCl and $CH_3COONa$, and, for alkali earth metals, $CaCl_2$ and $MgCl_2$. Among these, particularly preferred are salts of Na, K and Ca.

In the pre-treatment, the cloth can be impregnated with the above-mentioned substance in any method, for example by immersion, padding, coating or spraying.

As the printing ink applied to the cloth for ink jet printing is merely deposited on the cloth after the application, there is preferably executed fixation of the coloring material of the ink, such as dyes, to the fibers of the cloth. Such fixation can be achieved by an already known method, such as steaming method, HT steaming method or thermo-fixing method, or, in case of cloth not subjected to alkaline pre-treatment, alkali padding-steaming method, alkali blotching-streaming method, alkali shock method or alkali cold fixing method. Such fixation process may include a reactive step or may be without such reactive step depending on the kind of the dye, and examples of the latter include a process of physical impregnation into the fibers. Also the ink may be of any composition as long as desired coloring materials are contained, and the coloring materials are not limited to dyes but can also contain pigments.

Also, the unreacted dye and the substance use in pre-treatment can be removed by rinsing in an already known manner, after the reactive fixing step mentioned above. At such rinsing, there is preferably executed the conventional fixing process in combination.

The printed cloth subjected to the post-treatment process mentioned above is then cut into desired sizes, and the cut pieces are subjected to the steps of sewing, adhesion or fusion for obtaining final products, such as one-piece dress, necktie or swimsuits, mattress cover, chair cover, handkerchief or curtain.

Also, the printing medium can be, for example, cloth, wall cloth, embroidering yarn, paper or OHP film, and the cloth includes any and all woven, non-woven and other textiles regardless of the material, method of weaving or knitting thereof.

As detailedly explained in the foregoing, the present invention allows to obtain a defect-free record by executing, in case of abnormality in the recording element, by executing a complementary recording with a recording element without such abnormality after the recording operation by the main scan. In particular, the recording element used in such complementary recording is changed according to the total sum of the frequency of recordings executed by such recording element, whereby the loss in the service life of the recording element used in the complementary recording can be suppressed and the substantial service life of the entire recording head can be extended. Also, there is not required a head exclusive for the complementary recording, other than the ordinary recording head, so that the complementary recording can be achieved without complicating the configuration of the apparatus itself or without increasing the dimension thereof.

Furthermore, the complementary recording can be executed in the reverse main scan after the sub-scan for the complementary recording, whereby the defect generated by the abnormal recording element can be complemented without loss in the throughput of recording.

What is claimed is:

1. A recording method for recording an image by repeating a main scan of moving a recording head, including an array of plural recording elements, relative to a recording medium and driving said recording elements in the course of the movement to thereby record on said recording medium, and a sub-scan of moving said recording head relative to said recording medium in a direction perpendicular to a direction of said main scan, the method comprising steps of:

moving said recording medium relative to said recording head in a direction of said sub-scan, in case at least one of said plural recording elements is an abnormal one, so as to cause a normal recording element, which is different from the abnormal recording elements, to be opposed to an area of said recording medium where the abnormal recording element is to perform recording, in such a manner that said normal recording element can perform recording to the area of said recording medium;

executing complementary recording which is for recording to the area of said recording medium in place of the abnormal recording element by driving the normal recording element caused to be opposed to the area of said recording medium, wherein the number of drivings of the normal recording element during complementary recording is counted;

executing regular recording which is recording other than the complementary recording by driving the normal recording element, wherein the number of drivings of the normal recording element during regular recording is counted; and changing the recording element used for said complementary recording from the normal recording element to another normal recording element, based on the total number of drivings of the normal recording element in both the complementary recording step and the regular recording step.

2. A recording method according to claim 1, wherein a reference value for changing the recording element used for said complementary recording is set in advance based on a service life value of the number of drives of said recording elements and the recording element used for said complementary recording is changed when said total sum exceeds said reference value for complementary recording.

3. A recording method according to claim 1, wherein said complementary recording is executed in a returning main scan after the sub-scan for said complementary recording.

4. A recording method according to claim 1, wherein said complementary recording is executed in a main scan after the sub-scan for said complementary recording.

5. A recording method according to claim 1, further comprising a step of detecting the recording element showing said abnormality, prior to the main scan for recording on said recording medium.

6. A recording method according to claim 5, wherein, in the main scan for recording on said recording medium, recording is executed without the recording element showing said abnormality.

7. A recording method according to claim 5, wherein said step of detecting the recording element showing said abnormality includes steps of:

forming a predetermined detection pattern on a detection medium, different from said recording medium, by driving all of said plural recording elements; and optically detecting whether said detection pattern contains an unrecorded portion.

8. A recording apparatus provided with main scan means for causing a recording head, including an array of plural recording elements, to execute a main scan relative to a recording medium, recording head drive means for driving said recording elements in the course of the main scan by said main scan means to thereby record on said recording medium, and sub-scan means for causing said recording head to execute a sub-scan relative to said recording medium in a direction perpendicular to a direction of said main scan, the apparatus comprising:

moving means for moving said recording medium relative to said recording head in a direction of said sub-scan, in case at least one of said plural recording elements is an abnormal one, so as to cause a normal recording element, which is different from the abnormal recording elements, to be opposed to an area of said recording medium where the abnormal recording element is to perform recording, in such a manner that said normal recording element can perform recording to the area of said recording medium;

controller means for executing complementary recording which is for recording to the area of said recording medium in place of the abnormal recording element by driving the normal recording element caused to be opposed to the area of said recording medium, wherein the number of drivings of the normal recording element during complementary recording is counted, and executing regular recording which is recording other than the complementary recording, by driving the normal recording element, wherein the number of drivings of the normal recording element during regular recording is counted; and changing means for changing the recording element used for said complementary recording from the normal recording element to another normal recording element, based on the total number of drivings of the normal recording element in both the complementary recording step and the regular recording step.

9. A recording apparatus according to claim 8, wherein a counter means is adapted to count the number of drives of said normal recording element, and said control means is adapted to change the normal recording element used for said complementary recording in case the number of drives of said another recording elements, counted by said counter means, exceeds a reference value for complementary recording, set in advance based on a service life value of the number of drives of said recording elements.

10. A recording apparatus according to claim 8, wherein said control means is adapted to control said head drive means in such a manner that said complementary recording is executed in a returning main scan.

11. A recording apparatus according to claim 8, wherein said control means is adapted to control said head drive means in such a manner that said complementary recording is executed in another main scan after completing said main scan.

12. A recording apparatus according to claim 8, wherein each of said recording elements includes a discharge opening for discharging ink, and discharge means for causing each of said discharge openings to discharge ink.

13. A recording apparatus according to claim 12, wherein said discharge means is a thermal energy generating member for providing the ink with thermal energy, and a state change is induced in the ink by the heat generated by said thermal energy generating member whereby ink is discharged from said discharge opening.

14. A recording apparatus according to claim 8, wherein cloth is employed as said recording medium.

15. A recording apparatus according to claim 8, further comprising abnormality detection means for detecting the recording element showing said abnormality.

16. A recording apparatus according to claim 15, wherein said control means is adapted to control said recording head drive means in such a manner that, among said plural recording elements, those not showing the abnormality alone are driven.

17. A recording apparatus according to claim 15, wherein said abnormality detection means includes an optical element for optically detecting a detection pattern obtained by driving all of said recording elements.

* * * * *

UNITED STATES PATENT AND TRADEMARK OFFICE
CERTIFICATE OF CORRECTION

Figure 14B:
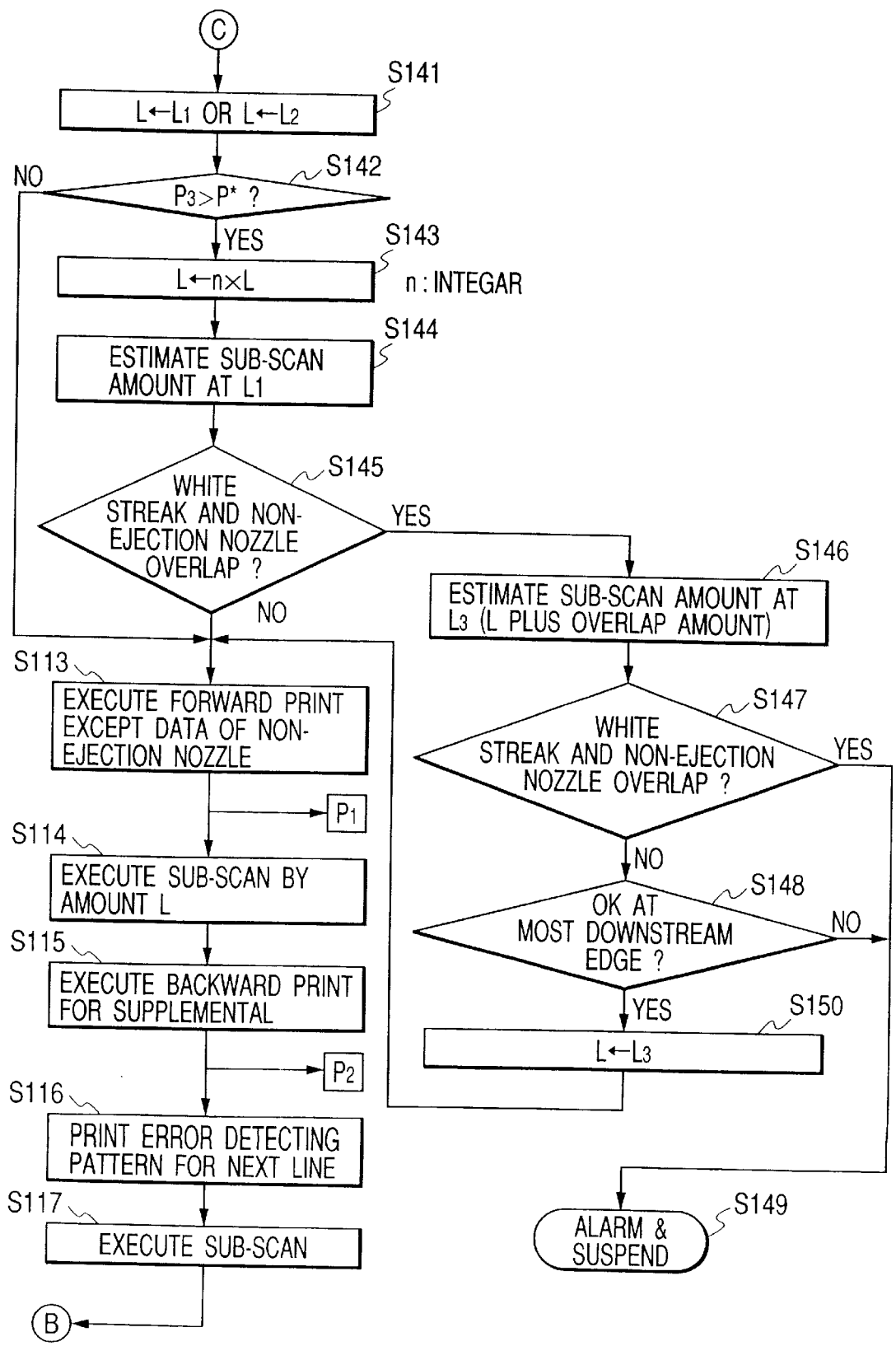
FIG. 14 which is composed of FIGS. 14A and 14B and FIG. 15 which is composed of FIGS. 15A and 15B are flow charts showing the recording operation in the fifth embodiment of the present invention.
Figures 15, 15A, 15B:
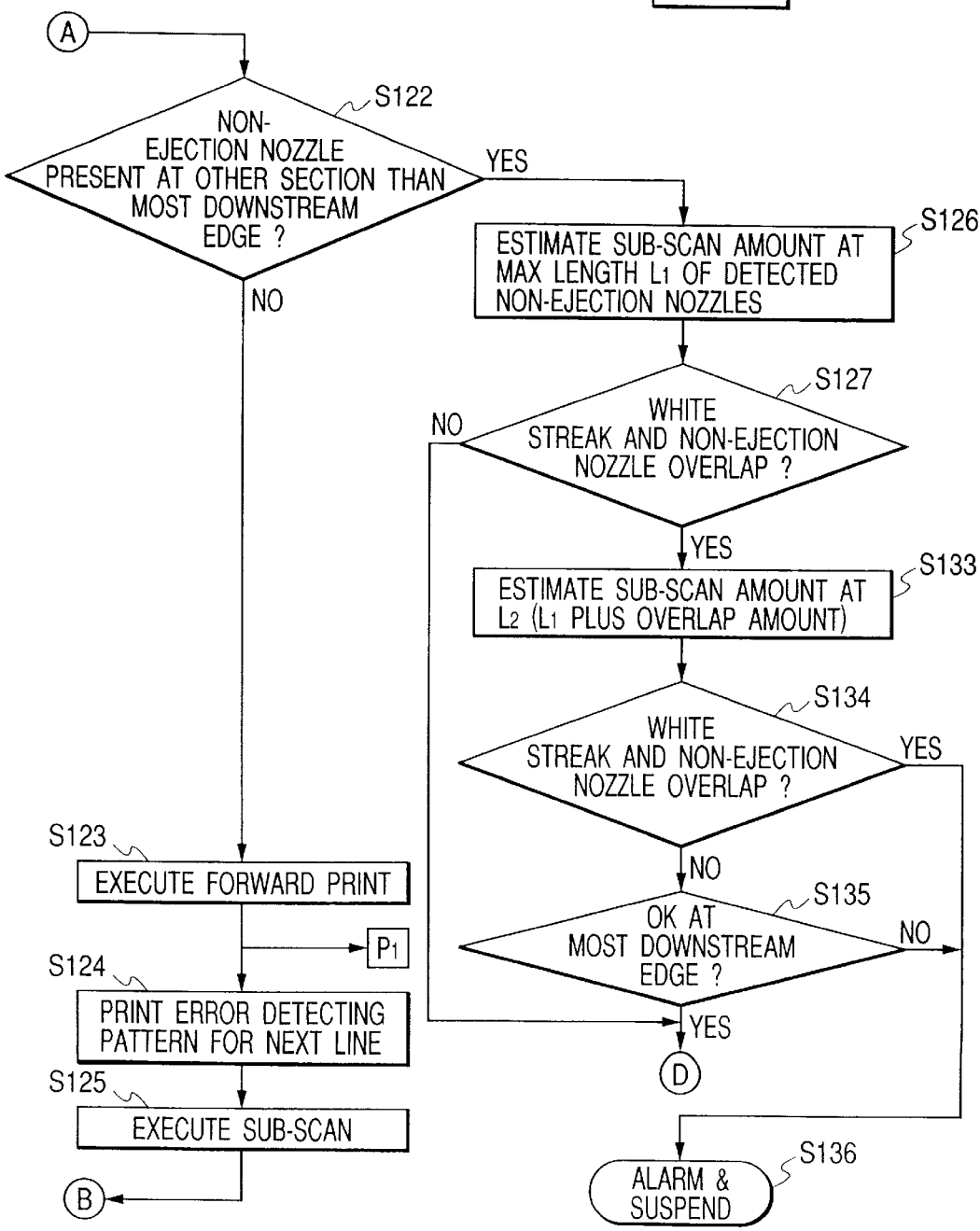
Figure 15B:
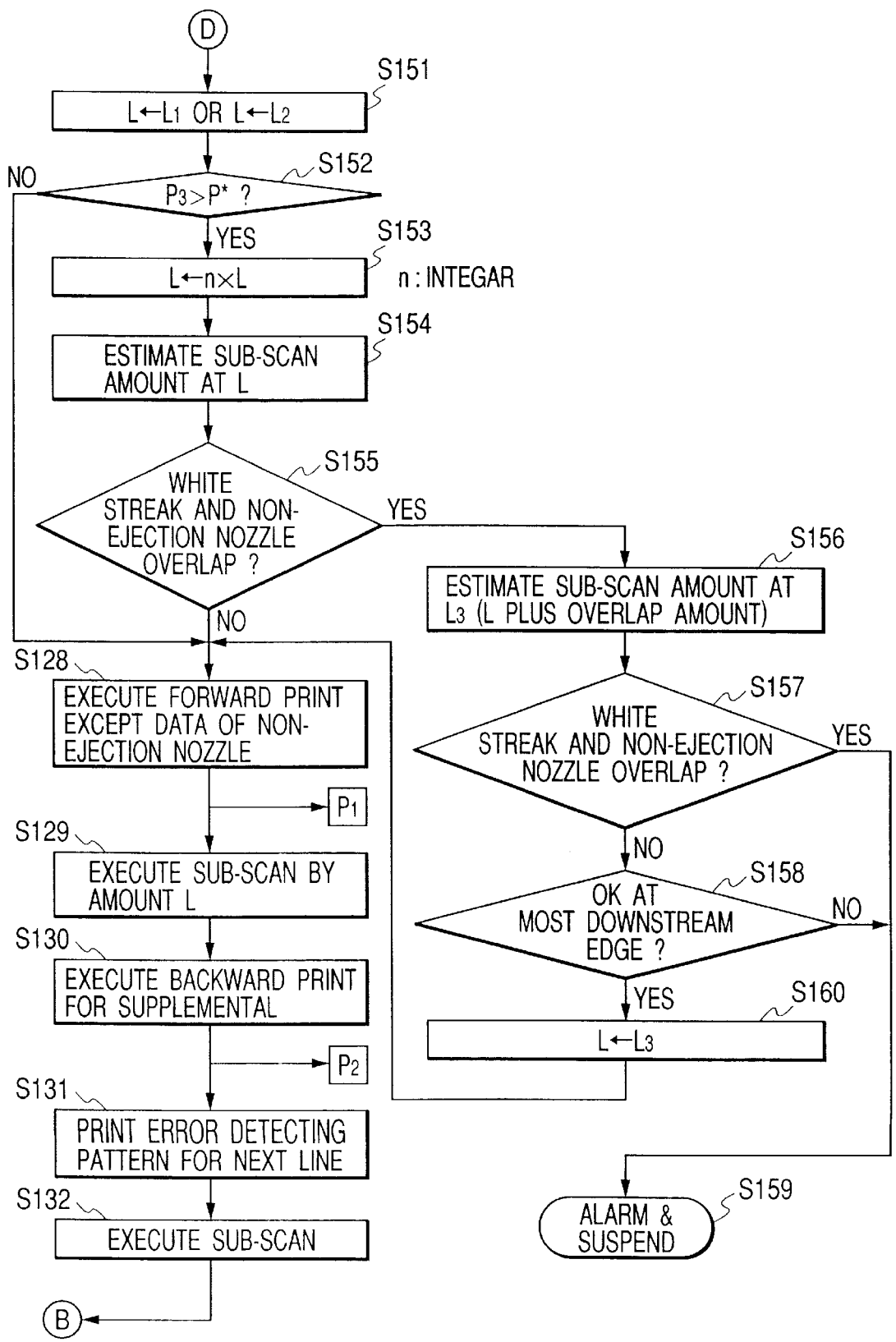

PATENT NO.   : 6,347,855 B1                                                            Page 1 of 1
DATED        : February 19, 2002
INVENTOR(S)  : Yasuyuki Takanaka It is certified that error appears in the above-identified patent and that said Letters Patent is hereby corrected as shown below:

Drawings,
Sheet 13, FIG. 14B, S143, "INTEGAR" should read -- INTEGER --; and
Sheet 15, FIG. 15B, S153, "INTEGAR" should read -- INTEGER --.

Column 2,
Line 60, "functions," should read -- functioning, --.

Column 3,
Line 60, "Consequently" should read -- Consequently, --.

Column 4,
Line 8, "a" should be deleted.

Column 12,
Line 9, "in" should read -- is --.

Column 19,
Line 42, "is" should read -- it is --.

Column 22,
Line 2, "form" should read -- form of --.

Signed and Sealed this

Twenty-eighth Day of January, 2003

JAMES E. ROGAN
*Director of the United States Patent and Trademark Office*